(12) United States Patent
Lamsahel

(10) Patent No.: US 10,763,770 B2
(45) Date of Patent: Sep. 1, 2020

(54) METHOD, COMPUTER PROGRAM PRODUCT AND SYSTEM FOR OPERATING AN ASYNCHRONOUS MACHINE

(71) Applicant: ZF FRIEDRICHSHAFEN AG, Friedrichshafen (DE)

(72) Inventor: Hassan Lamsahel, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/413,266

(22) Filed: May 15, 2019

(65) Prior Publication Data
US 2019/0356256 A1 Nov. 21, 2019

(30) Foreign Application Priority Data
May 16, 2018 (DE) .................. 10 2018 207 583

(51) Int. Cl.
| | |
|---|---|
| H02P 21/22 | (2016.01) |
| H02P 21/14 | (2016.01) |
| H02P 25/22 | (2006.01) |
| H02P 27/08 | (2006.01) |

(52) U.S. Cl.
CPC ........... *H02P 21/22* (2016.02); *H02P 21/14* (2013.01); *H02P 25/22* (2013.01); *H02P 27/08* (2013.01)

(58) Field of Classification Search
None
See application file for complete search history.

(56) References Cited

U.S. PATENT DOCUMENTS

| | | | | |
|---|---|---|---|---|
| 2002/0005704 A1* | 1/2002 | Yoshikawa | ........... | H02M 7/493 318/727 |
| 2013/0200827 A1* | 8/2013 | Kezobo | ............... | B62D 5/0487 318/400.21 |
| 2018/0043928 A1* | 2/2018 | Fujita | .................... | B62D 5/0463 |
| 2019/0359253 A1* | 11/2019 | Kuramitsu | ............ | H02P 29/032 |

* cited by examiner

*Primary Examiner* — Bickey Dhakal
(74) *Attorney, Agent, or Firm* — Cozen O'Connor

(57) ABSTRACT

Operating an asynchronous machine includes: closed loop control of a first and a second three-phase winding by a first and a second closed loop control method, respectively. The second closed loop control method supplies a voltage vector to a second inverter device, and changes from the first closed loop control method to a first open loop control method. The first open loop control method includes supplying a first reference current vector to a first filter device, supplying a filtered first reference current vector to a calculation device for calculating an electrical angle, supplying the electrical angle to a first transformation device for transforming a first open loop control deviation vector, transforming a first open loop control deviation vector into a third voltage vector, and supplying the third voltage vector to the first inverter device for the operation of the first three-phase winding.

8 Claims, 9 Drawing Sheets

METHOD, COMPUTER PROGRAM PRODUCT AND SYSTEM FOR OPERATING AN ASYNCHRONOUS MACHINE

BACKGROUND OF THE INVENTION

1. Field of the Invention

The invention is directed to a method, a system, and computer program product for operating an asynchronous machine in which a first three-phase winding is controlled by a first closed loop control method and a second three-phase winding is controlled by a second closed loop control method. The invention is further directed to an asynchronous machine.

2. Description of the Related Art

An asynchronous machine can be operated, for example, in that it is controlled by a field-oriented control (FOC). For this purpose, phase currents that flow through the individual phases of the three-phase machine must be determined individually and as exactly as possible.

In order to safeguard against particular defects, for example, a winding short circuit or power supply failure, asynchronous machines with a redundant power supply are used, for example, a six-phase asynchronous machine. The asynchronous machine has a stator with two sets of three-phase windings. If a current sensor fails or if a current sensor is switched off, the respective winding can no longer be controlled by field-oriented control.

SUMMARY OF THE INVENTION

It is an object of one aspect of the present invention to provide an improved method, system and computer program product for operating an asynchronous machine.

Disclosed is a method for operating an asynchronous machine, which method has closed loop control of a first three-phase winding by a first closed loop control method and closed loop control of a second three-phase winding by a second closed loop control method. The first closed loop control method includes supplying a first voltage vector to a first inverter device for the operation of the first three-phase winding, and the second closed loop control method includes supplying a second voltage vector to a second inverter device for the operation of the second three-phase winding. The method further comprises changing from the first closed loop control method to a first open loop control method in reaction to a first event. The first open loop control method comprises supplying a first reference current vector to a first filter device for filtering the first reference current vector, supplying the filtered first reference current vector to a calculation device for calculating an electrical angle, supplying the electrical angle to a first transformation device for transforming a first open loop control deviation vector, transforming a first open loop control deviation vector into a third voltage vector, and supplying the third voltage vector to the first inverter device for the operation of the first three-phase winding.

An asynchronous machine is an electric three-phase motor having a rotor and a stator with at least a first three-phase winding and a second three-phase winding. A three-phase winding has three electric coils which are conventionally arranged in the form of a circle so as to be offset in each instance by an angle of 120°. The second three-phase winding can be offset by any angle, for example, even by an angle of 0°, relative to the first three-phase winding. The second three-phase winding on the stator typically serves to provide a redundancy in order to enhance the failure safety of the asynchronous machine. The first three-phase winding is fed by a first power supply. The second three-phase winding is often fed by a second power supply, which is different from a first power supply, to further enhance failure safety. However, the second three-phase winding can also be fed by the first power supply.

The first closed loop control method carries out a closed loop field-oriented control, wherein the first closed loop control method supplies a first voltage vector to the first inverter device from reference values and measurement values of the first three-phase winding. Analogously, the second closed loop control method realizes a closed loop field-oriented control, wherein the second closed loop control method supplies a second voltage vector to the second inverter device from reference values and measurement values of the second three-phase winding.

The method further comprises changing from the first closed loop control method to a first open loop control method in reaction to a first event. The first event can comprise, for example, reaching, receiving, exceeding, falling below, or failure of an operating parameter, an operating quantity, and/or an environment quantity.

The first open loop control method comprises supplying a first reference current vector to a first filter device for filtering the first reference current vector. The first reference current vector is a current vector in the rotor coordinate system predetermined by the asynchronous machine, for example, by a speed control. The first reference current vector can be derived from a master control or user inputs. Filtering the first reference current vector serves to simulate the dynamic of the open loop control method. The first filter device comprises, for example, a first-order lag element. The filtered first reference current vector should replace a first measurement vector, which is not available during the open loop field-oriented control. To this end, the filter device is configured to simulate the relationship between the first reference current vector and the phase currents in the first three-phase winding as precisely as possible.

The first open loop control method further comprises supplying the filtered first reference current vector to a calculation device for calculating an electrical angle. The calculation device, also known as flux model, calculates an electrical angle of the rotor flux $\beta_\psi$ with reference to an $\alpha$, $\beta$ stator coordinate system of the first three-phase winding from the filtered first reference current vector and the second measurement vector. The electrical angle of the rotor flux $\beta_\psi$ is necessary for transformations from a stator-fixed coordinate system, for example, an $\alpha$, $\beta$ stator coordinate system, into the rotor coordinate system and, conversely, from a rotor coordinate system into a stator-fixed coordinate system, for example, an $\alpha,\beta$ stator coordinate system. Such transformations are equally necessary for an open loop field-oriented control and for a closed loop field-oriented control. For this reason, the first closed loop control method and the second closed loop control method also usually include calculation of the same electrical angle, namely, the electrical angle of the rotor flux $\beta_\psi$ with reference to an $\alpha$, $\beta$ stator coordinate system of the first three-phase winding by a calculation device. The first closed loop control method includes supplying a first measurement vector to the calculation device for calculating an electrical angle. The second closed loop control method includes supplying a second measurement vector to the calculation device for calculating an electrical angle. Typically, the electrical angle is calculated by this same calculation device in the first closed loop control method, in the second closed loop control method and in the first open loop control method. The electrical angle is calculated by the calculation device from a first measurement vector or, in case this is not available, from a filtered first reference current vector, and a second measurement vector or, if this is not available, from a filtered second reference current vector.

The first open loop control method further comprises a transformation of a first open loop control deviation vector into a third voltage vector. The transformation includes transforming the first open loop control deviation vector from a rotor coordinate system into a stator-fixed coordinate system by a first transformation device by the electrical angle. For the open loop field-oriented control, the first open loop control deviation vector exists in the rotor coordinate system. Conversely, for a space vector modulation of the first inverter, the third voltage vector is provided in a stator-fixed coordinate system.

The transformation of the first closed loop control deviation vector into a first voltage vector can be carried out as part of the first closed loop control method preferably by the first transformation device. That is, the transformation of the first closed loop control deviation vector into a first voltage vector can be carried out by the same first transformation device which was introduced in the open loop control method for transforming the first open loop control deviation vector into a third voltage vector. Alternatively, the transformation of the first closed loop control deviation vector into a first voltage vector can be carried out by a device other than the first transformation device.

The first open loop control method further includes supplying the third voltage vector to the first inverter device for the operation of the first three-phase winding. Supplying the third voltage vector to the first inverter device for the operation of the first three-phase winding is carried out by the space vector modulation. In so doing, a third PWM vector is generated from the third voltage vector. To this end, the third voltage vector is interpreted as space vector in a two-dimensional plane. The three phases of the first three-phase winding are interpreted as three voltage space vectors in the two-dimensional plane. The third voltage vector is mapped by a three-dimensional PWM vector, and each component of the PWM vector decides the duration over which one of three voltage space vectors is displayed. Because of the lowpass effect of the stator windings, an average current corresponding to the desired space vector results in the first three-phase winding of the asynchronous machine. Accordingly, supplying the third voltage vector to the first inverter device for the operation of the first three-phase winding according to the first open loop control method is carried out in exactly the same way that the first voltage vector is supplied to the first inverter device for the operation of the first three-phase winding according to the first closed loop control method and can therefore also be carried out by the same components.

In this way, it is possible to provide a redundant drive at an expenditure that is appreciably lower than would be required by a redundant asynchronous machine. Costs as well as installation space can be saved in this way. Nevertheless, the asynchronous machine can be controlled without restrictions.

According to a further embodiment form, the method further includes changing from the second closed loop control method to a second open loop control method in reaction to the first event and/or a second event. The second open loop control method includes supplying a second reference current vector to a second filter device for filtering the second reference current vector, supplying the filtered second reference current vector to the calculation device for calculating the electrical angle, supplying the electrical angle to a second transformation device for transforming a second open loop control deviation vector, generating a fourth voltage vector from the second open loop control deviation vector, and supplying the fourth voltage vector to the second inverter for the operation of the second three-phase winding.

Like the first event, the second event can comprise reaching, receiving, exceeding, falling below or failure of an operating parameter, an operating quantity and/or an environment quantity.

The second open loop control method comprises supplying a second reference current vector to a second filter device for filtering the second reference current vector. The second reference current vector is a current vector in the rotor coordinate system predetermined by the asynchronous machine, for example, by a speed control. The second reference current vector can be derived from a master control or user inputs. Filtering the second reference current vector serves to simulate the dynamic of the open loop control method. The second filter device comprises, for example, a first-order lag element. The filtered second reference current vector should replace a second measurement vector which is not available during the open loop field-oriented control. To this end, the filter device is configured to simulate the relationship between the second reference current vector and the phase currents in the second three-phase winding as precisely as possible.

The second open loop control method further comprises supplying the filtered second reference current vector to a calculation device for calculating an electrical angle. The calculation device is typically the same calculation device that calculates the electrical angle of the rotor flux $\beta_\psi$ according to the first open loop control method, the first closed loop control method and the second closed loop control method. The calculation device, or flux model, accordingly calculates the electrical angle of the rotor flux $\beta_\psi$ with reference to an $\alpha$, $\beta$ stator coordinate system of the first three-phase winding from the filtered first reference current vector and the filtered second reference current vector.

The electrical angle of the rotor flux $\beta_\psi$ is necessary for transformations from a stator-fixed coordinate system, for example, an $\alpha$, $\beta$ stator coordinate system, into the rotor coordinate system and, conversely, from a rotor coordinate system into a stator-fixed coordinate system, for example, an $\alpha$, $\beta$ stator coordinate system. Such transformations are equally necessary for an open loop field-oriented control and for a closed loop field-oriented control.

The electrical angle is calculated by the calculation device from the first measurement vector or, in case this is not available, from the filtered first reference current vector, and the second measurement vector or, if this is not available, from the filtered second reference current vector.

The second open loop control method further comprises a transformation of a second open loop control deviation vector into a fourth voltage vector. The transformation includes transforming the second open loop control deviation vector from a rotor coordinate system into a stator-fixed coordinate system by a second transformation device by the electrical angle. For the open loop field-oriented control, the second open loop control deviation vector exists in the rotor coordinate system. Conversely, for a space vector modulation of the second inverter, the fourth voltage vector is provided in a stator-fixed coordinate system.

The transformation of the second closed loop control deviation vector into a second voltage vector can be carried out as part of the second closed loop control method preferably by the second transformation device which was introduced in the second open loop control method for transforming the first open loop control deviation vector into a third voltage vector. That is, the transformation of the second closed loop control deviation vector into a second voltage vector can be carried out by the same transformation device as that carrying out the transformation of the second open loop control deviation vector into a fourth voltage vector. Alternatively, the transformation of the second closed loop control deviation vector into a second voltage vector can be carried out by a device other than the second transformation device.

The second open loop control method further includes supplying the fourth voltage vector to the second inverter device for the operation of the second three-phase winding. Supplying the fourth voltage vector to the second inverter device for the operation of the second three-phase winding is carried out by the space vector modulation. In so doing, a fourth PWM vector is generated from the fourth voltage vector. To this end, the fourth voltage vector is interpreted as a space vector in a two-dimensional plane. The three phases of the second three-phase winding are interpreted as three voltage space vectors in the two-dimensional plane. The fourth voltage vector is mapped by a three-dimensional PWM vector, and each component of the PWM vector decides the duration over which one of three voltage space vectors is displayed. Because of the lowpass effect of the stator windings, an average current corresponding to the desired space vector results in the second three-phase winding of the asynchronous machine. Accordingly, supplying the fourth voltage vector to the second inverter device for the operation of the second three-phase winding according to the second open loop control method is carried out in exactly the same way that the second voltage vector is supplied to the second inverter device for the operation of the second three-phase winding according to the first closed loop control method and can therefore also be carried out by the same components.

In this way, it is possible to completely prevent noise problems during the operation of asynchronous machines with current sensors in particular power ranges or torque ranges. Further costs and installation space can be saved in this way.

According to a further development of the method, the first event comprises a failure of a current sensor associated with the first three-phase winding.

Since a knowledge of the phase currents is essential for the implementation of a closed loop field-oriented control, the closed loop field-oriented control can usually not be continued following a failure of a current sensor. Insofar as redundant current sensors are available, for example, more than two current sensors for a three-phase winding, the first event can also comprise the failure of a plurality of current sensors so that the closed loop field-oriented control cannot be continued. The first event can include another event that defeats a closed loop field-oriented control, for example, an interruption in a line to a current sensor.

Due to the fact that the method comprises changing from the first closed loop control method to a first open loop control method in response to a failure of a current sensor associated with the first three-phase winding, the asynchronous machine can be further operated at full power even when a current sensor, which is essential for the closed loop field-oriented control, has failed. A good-quality actuation can be achieved in this way.

In order to further improve the quality of actuation, a larger proportion of the load, for example, 60%, 70%, 80%, or 90%, can be transferred to the second three-phase winding, which continues to be operated by closed loop field-oriented control.

According to a further development of the method, the second event comprises a failure of a current sensor associated with the second three-phase winding.

Since, as was already mentioned, a knowledge of the phase currents is essential for the implementation of a closed loop field-oriented control, the closed loop field-oriented control can usually not be continued following a failure of a current sensor. Insofar as redundant current sensors are available, for example, more than two current sensors for the second three-phase winding, the second event can also comprise the failure of a plurality of current sensors so that the closed loop field-oriented control for the second three-phase winding cannot be continued. The second event can include another event that defeats a closed loop field-oriented control, for example, an interruption in a line to a current sensor.

Due to the fact that the method comprises changing from the second closed loop control method to a second open loop control method in response to a failure of a current sensor associated with the second three-phase winding, the asynchronous machine can be further operated at full power even when the closed loop field-oriented control is no longer usable for lack of sufficient information about the phase currents for any of the three-phase windings. Nevertheless, a good-quality actuation can be achieved.

According to a further development of the method, the first event and/or the second event comprises a user input.

In the context of a closed loop field-oriented control, the use of current sensors in particular power ranges or speed ranges can cause noise problems. These noise problems need not always be disruptive, for example, in a loud environment. Due to the fact that the method includes changing from a closed loop control method to an open loop control method in response to a user input, users themselves can decide when a more stable, lower-wear control is more important and when a quieter operation is more important.

According to a further development of the method, the first closed loop control method includes receiving a first measurement vector, which first measurement vector has three phase current values, calculating a first difference from the first reference current vector and from the first measurement vector, supplying the first difference to a proportional integrator for generating a first closed loop control deviation vector, transforming the first closed loop control deviation vector into a first voltage vector by an electrical angle, and supplying the first voltage vector to a first inverter device for the operation of the first three-phase winding. In this regard, supplying the first voltage vector to the first inverter device for the operation of the first three-phase winding includes generating a first PWM vector from the first voltage vector and supplying the first PWM vector to the first inverter, which first inverter drives the first three-phase winding.

The first measurement vector comprises phase current values, or phase currents, of the first three-phase winding. In this regard, a phase current can be measured by a current sensor. Alternatively, a phase current can be calculated. A current sensor can also be used for measuring a plurality of phase currents, for example, by a plurality of measurements at different times during a switching period.

Preferably, for the first measurement vector, a first phase current of the first three-phase winding and a second phase current of the first three-phase winding are measured in each instance by a current sensor, and a third phase current of the first three-phase winding is calculated by applying Kirchoff's law in the intermediate voltage circuit of the first three-phase winding.

Calculating a first difference from the first reference current vector and the first measurement vector comprises transforming the first measurement vector into the rotor coordinate system in which the second reference current vector is provided and taking the arithmetical difference of the first reference current vector and the first measurement vector. That is, the first measurement vector is subtracted from the first reference current vector. The resulting vector can have positive and negative components depending on whether the first reference current vector is greater than or less than the first measurement vector in the corresponding components.

For each phase of the first three-phase winding, the first closed loop control deviation vector shows the error of the actual current relative to the reference current. To this end, the first closed loop control deviation vector is generated from the first difference by the addition of a proportional component to the first difference and an integral component formed by integration of the first difference over a resetting time. The allocation into proportional component and integral component and the resetting time are predetermined in coordination with the asynchronous machine and use thereof for achieving a desired control behavior.

The transformation of the first closed loop control deviation vector into the first voltage vector comprises transforming a rotor coordinate system into a stator-fixed coordinate system. For the closed loop field-oriented control, the first closed loop control deviation vector is provided in the rotor coordinate system. For a space vector modulation of the first inverter, on the other hand, the first voltage vector is provided in a stator-fixed coordinate system.

Supplying the first voltage vector to the first inverter device for the operation of the first three-phase winding is carried out by the space vector modulation. In so doing, a first PWM vector is generated from the first voltage vector. To this end, the first voltage vector is interpreted as space vector in a two-dimensional plane. The three phases of the first three-phase winding are interpreted as three voltage space vectors in the two-dimensional plane. The first voltage vector is mapped by a three-dimensional PWM vector, and each component of the PWM vector decides the duration over which one of three voltage space vectors is displayed. Because of the lowpass effect of the stator windings, an average current corresponding to the desired space vector results in the first three-phase winding of the asynchronous machine.

The first PWM vector is supplied to the first inverter. The first inverter drives the first three-phase winding. In this regard, every component of the first PWM vector switches a half bridge which belongs to a phase of the first three-phase winding.

The second closed loop control method functions substantially like the first closed loop control method.

Analogous to the first closed loop control method, the second measurement vector comprises phase current values, or phase currents, of the second three-phase winding. Preferably, for the second measurement vector, a first phase current of the second three-phase winding and a second phase current of the second three-phase winding are measured in each instance by a current sensor, and a third phase current of the second three-phase winding is calculated by applying Kirchoff's law in the intermediate voltage circuit of the second three-phase winding.

Calculating a second difference from the second reference current vector and the second measurement vector comprises transforming the second measurement vector into the rotor coordinate system in which the second reference current vector is provided and taking the arithmetical difference of the second reference current vector and the second measurement vector. That is, the second measurement vector is subtracted from the second reference current vector. The resulting vector can have positive and negative components depending on whether the second reference current vector is greater than or less than the second measurement vector in the corresponding components.

For each phase of the second three-phase winding, the second closed loop control deviation vector shows the error of the actual current relative to the reference current. To this end, the second closed loop control deviation vector is generated from the second difference by the addition of a proportional component to the second difference and an integral component formed by integration of the second difference over a resetting time. The allocation into proportional component and integral component and the resetting time are predetermined in coordination with the asynchronous machine and use thereof for achieving a desired control behavior.

The transformation of the second closed loop control deviation vector into the second voltage vector comprises transforming a rotor coordinate system into a stator-fixed coordinate system. For the closed loop field-oriented control, the second closed loop control deviation vector is provided in the rotor coordinate system. For a space vector modulation of the second inverter, on the other hand, the second voltage vector is provided in a stator-fixed coordinate system.

Supplying the second voltage vector to the second inverter device for the operation of the second three-phase winding is carried out by the space vector modulation. In so doing, a second PWM vector is generated from the second voltage vector. To this end, the second voltage vector is interpreted as space vector in a two-dimensional plane. The three phases of the second three-phase winding are interpreted as three voltage space vectors in the two-dimensional plane. The second voltage vector is mapped by a three-dimensional PWM vector, and each component of the PWM vector decides the duration over which one of three voltage space vectors is displayed. Because of the lowpass effect of the stator windings, an average current corresponding to the desired space vector results in the second three-phase winding of the asynchronous machine.

The second PWM vector is supplied to the second inverter. The second inverter drives the second three-phase winding. In this regard, every component of the second PWM vector switches a half bridge, which belongs to a phase of the second three-phase winding.

The first closed loop control method and/or second closed loop control method described above leads to a stable, dynamic control at low cost.

The above-stated aspects of the invention are further met by a computer program product for the operation of an asynchronous machine with program code for implementing a method according to aspects of the preceding examples.

As regards the advantages, reference is made to the above-stated embodiment examples of the method according to aspects of the invention.

The above-stated object is further met by an asynchronous machine comprising a stator with a first three-phase winding and a second three-phase winding, a rotor, a first inverter device, and a second inverter device, the asynchronous machine being operated with a method according to one of the preceding embodiment examples.

As regards the advantages, reference is made to the above-stated embodiment examples of the method according to aspects of the invention.

The above-stated object is further met by a system for the operation of an asynchronous machine comprising an asynchronous machine. The asynchronous machine has a stator with a first three-phase winding and a second three-phase winding, and a rotor. The system further comprises a first closed loop control device, a first transformation device and a first inverter device. The first closed loop control device is configured to determine a first closed loop control deviation vector and supply it to the first transformation device, and the first transformation device is configured to transform the first closed loop control deviation vector into a first voltage vector and to supply it to the first inverter device. The system further comprises a second closed loop control device, a second transformation device and a second inverter device. The second closed loop control device is configured to determine a second closed loop control deviation vector and supply it to the second transformation device, and the second transformation device is configured to transform the second closed loop control deviation vector into a second voltage vector and to supply it to the second inverter device. The system further comprises a first filter device, a calculation device and a first open loop control device. The first filter device is configured to filter a first reference current vector and supply the filtered first reference current vector to the calculation device. The calculation device is configured to calculate an electrical angle and supply it to the first transformation device, and the first open loop control device is configured to determine a first open loop control deviation vector and supply it to the first transformation device. The first transformation device is further configured to transform the first open loop control deviation vector into a third voltage vector and supply it to the first inverter device. The first transformation device is further configured to transform the first open loop control deviation vector into a third voltage vector in reaction to a first event and supply it to the first inverter device and supply it to the first inverter device instead of the first voltage vector.

The asynchronous machine is an electric three-phase machine in which a rotor lags behind the rotational field of a stator. The rotational field of the stator is generated by a first three-phase winding and a second three-phase winding, which complement one another. A three-phase winding has three electric coils, which are usually arranged so as to be offset in a circular shape by an angle of 120° in each instance. The second three-phase winding can be offset relative to the first three-phase winding by any angle, for example, even by an angle of 0°. The second three-phase winding on the stator usually serves to provide a redundancy in order to enhance the failure safety of the asynchronous machine. The first three-phase winding is fed by a first power supply. The second three-phase winding is often fed by a second power supply which is different from a first power supply so as to further enhance failure safety. However, the second three-phase winding can also be fed by the first power supply.

The first closed loop control device is configured to determine a first closed loop control deviation vector and supply it to the first transformation device. For this purpose, the first closed loop control device typically comprises a current sensor, a subtractor, and a proportional integrator. The current sensor is configured to measure the phase currents of the first three-phase winding and supply them to the subtractor as first measurement vector. The subtractor is configured to calculate a first difference from a first reference current vector and the first measurement vector and supply it to the proportional integrator. The proportional integrator, also known as PI-controller, determines a closed loop control deviation vector as the sum of a vector proportional to the first difference and an integral component formed by integration of the first difference over a resetting time.

The first transformation device is configured to transform the first closed loop control deviation vector into a first voltage vector and supply it to the first inverter device. The first transformation device carries out an inverse Clarke transformation, for example, in the form of an electronic circuit, an FPGA or a microcontroller.

The first inverter device comprises a first space vector modulator, also called a space vector PWM, and generates a first PWM vector from the first voltage vector and supplies it to the first inverter.

The second closed loop control device is configured to determine a second closed loop control deviation vector and supply it to the second transformation device. For this purpose, the second closed loop control device typically comprises a current sensor, a subtractor, and a proportional integrator. The current sensor is configured to measure the phase currents of the second three-phase winding and supply them to the subtractor as second measurement vector. The subtractor is configured to calculate a second difference from a second reference current vector and the second measurement vector and supply it to the proportional integrator. The proportional integrator, also known as PI-controller, determines a closed loop control deviation vector as the sum of a vector proportional to the second difference and an integral component formed by integration of the second difference over a resetting time.

The second transformation device is configured to transform the second closed loop control deviation vector into a second voltage vector and supply it to the second inverter device. The second transformation device carries out an inverse Clarke transformation, for example, in the form of an electronic circuit, an FPGA or a microcontroller. In contrast to the first transformation device, the second transformation device is configured to take an offset angle between the first three-phase winding and the second three-phase winding into account during the transformation.

The second inverter device comprises a second space vector modulator, also called space vector PWM, and generates a second PWM vector from the second voltage vector and supplies it to the second inverter.

The first filter device is configured to filter a first reference current vector and supply the filtered first reference current vector to the calculation device. The first filter device comprises a first-order lag element, for example. Generally speaking, the filter device is configured to simulate the relationship between the first reference current vector and the phase currents in the first three-phase winding as precisely as possible.

The calculation device is configured to calculate an electrical angle and supply it to the first transformation device. The calculation device, also known as flux model, calculates an electrical angle of the rotor flux $\beta_\psi$ with respect to an $\alpha$, $\beta$ stator coordinate system of the first three-phase winding from the filtered first reference current vector and the second measurement vector. The electrical angle of the rotor flux $\beta_\psi$ is necessary for transformations from a stator-fixed coordinate system, for example, an $\alpha$, $\beta$ stator coordinate system, into the rotor coordinate system and, conversely, from a rotor coordinate system into a stator-fixed coordinate system, for example, an $\alpha$, $\beta$ stator coordinate system.

The first open loop control device is configured to determine a first open loop control deviation vector and supply it to the first transformation device. The first open loop control device determines the first open loop control deviation vector based on estimated phase currents and filtered phase currents. The first open loop control device simulates the dynamic of the first three-phase winding to provide a suitable first open loop control deviation vector that gives a good estimation of the error that the actual current has relative to the reference current.

The first transformation device is further configured to transform the first open loop control deviation vector into a third voltage vector in reaction to a first event and to supply it to the first inverter device instead of the first voltage vector. As has been described, the first transformation device carries out an inverse Clarke transformation. Since the first transformation device supplies the third voltage vector to the first inverter device, the first three-phase winding is accordingly not regulated by a closed loop field-oriented control but rather is controlled by an open loop field-oriented control.

According to a further development, the system additionally comprises a second filter device and a second open loop control device. The second filter device is configured to filter a second reference current vector and supply the filtered second reference current vector to the calculation device. The calculation device is further configured to calculate the electrical angle and supply it to the second transformation device, and the second open loop control device is configured to determine a second open loop control deviation vector and supply it to the second transformation device. The second transformation device is further configured to transform the second open loop control deviation vector into a fourth voltage vector in reaction to the first event or a second event and supply it to the second inverter device instead of the second voltage vector.

The second filter device is configured to filter a second reference current vector and supply the filtered second reference current vector to the calculation device. The second filter device comprises a second-order lag element, for example. Generally speaking, the filter device is configured to simulate the relationship between the second reference current vector and the phase currents in the second three-phase winding as precisely as possible.

The calculation device is further configured to calculate the electrical angle and supply it to the second transformation device. The calculation device, also known as flux model, calculates the electrical angle of the rotor flux $\beta_\psi$ with respect to an $\alpha$, $\beta$ stator coordinate system of the second three-phase winding from the filtered first reference current vector and the filtered second reference measurement vector. The electrical angle of the rotor flux $\beta_\psi$ is necessary for transformations from a stator-fixed coordinate system, for example, and $\alpha$, $\beta$ stator coordinate system, into the rotor coordinate system and, conversely, from a rotor coordinate system into a stator-fixed coordinate system, for example, an $\alpha$, $\beta$ stator coordinate system.

The second open loop control device is configured to determine a second open loop control deviation vector and supply it to the second transformation device. The second open loop control device determines the second open loop control deviation vector based on estimated phase currents and filtered phase currents. The second open loop control device simulates the dynamic of the second three-phase winding in order to provide a suitable second open loop control deviation vector which gives a good estimation of the error which the actual current has of the reference current.

The second transformation device is further configured to transform the second open loop control deviation vector into a fourth voltage vector in reaction to the first event or a second event and to supply it to the second inverter device instead of the second voltage vector. As has been described, the second transformation device carries out an inverse Clarke transformation. Since the second transformation device supplies the fourth voltage vector to the second inverter device, the second three-phase winding is accordingly not regulated by a closed loop field-oriented control but rather is controlled by an open loop field-oriented control.

As regards advantages, the method claims sharing similar features are referred to.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described in more detail referring to the appended drawings.

The drawings show.

DETAILED DESCRIPTION OF THE PRESENTLY PREFERRED EMBODIMENTS

Figure 1:
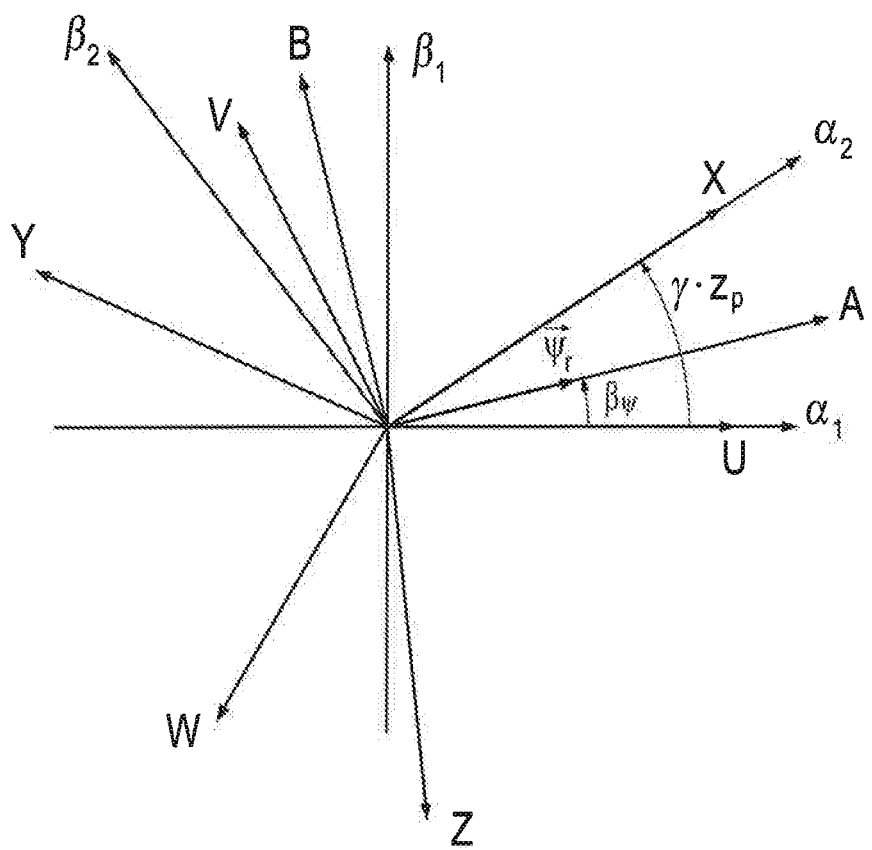
FIG. 1 is a schematic view of an asynchronous machine with different coordinate systems.

FIG. 1 shows a schematic view of an asynchronous machine with different coordinate systems. The coordinate systems of the first three-phase winding U, V, W and of the second three-phase winding X, Y, Z are shown first. Every three-phase winding comprises three coils which are offset by 120°. The coordinate system of the second three-phase winding X, Y, Z is offset by an angle $\gamma$ or by a phase $\gamma^*zp$ relative to the coordinate system of the first three-phase angle U, V, W. In this connection, zp is the number of pole pairs and γ*zp can be any angle, for example, γ*zp=0°, γ*zp=30° or γ*zp=60°. Coordinate system A,B is also shown. The rotor flux is directed to axis A. For regulation of the machine, the state values of the machine are transformed into the coordinate system A,B rotating with the rotor flux, wherein the A axis is directed in the same direction as the rotor flux, and the B axis extends perpendicular to the A axis. An α1β1 system which is the fixed two-coordinate system of the first three-phase winding U, V, W of the stator is also shown. The α2β2 system is the fixed two-coordinate system of the second three-phase winding X, Y, Z of the stator. The differential equations of the machine are simplified with the transformation of the state values of the two machine parts into an A,B coordinate system (rotor flux coordinate system). In this way, every machine part, i.e., three-phase winding U, W, W and three-phase winding X, Y, Z, can be regulated like a DC machine.

Figure 2:
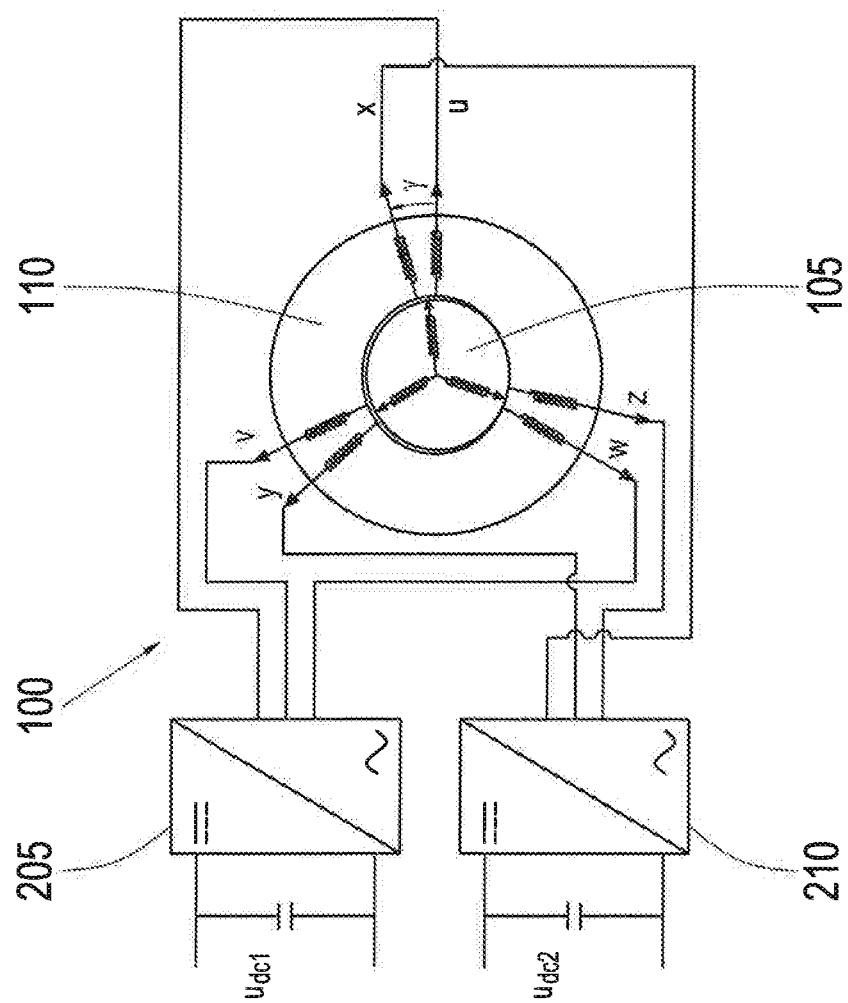
FIG. 2 is a schematic view of an asynchronous machine.

FIG. 2 shows a schematic view of an asynchronous machine 100. The asynchronous machine 100 has a rotor 105 and a stator 110. The stator has a first three-phase winding u, v, w and a second three-phase winding x, y, z. The second three-phase winding is offset by any angle γ relative to the first three-phase winding. The first three-phase winding u, v, w is operated by a first inverter 205, and the second three-phase winding x, y, z is operated by a second inverter 210. The first inverter 205 is supplied by a first supply voltage Udc1, and the second inverter 210 is supplied by a second supply voltage Udc2. The supply voltages Udc1 and Udc2 are DC voltages and come from one or more DC voltage sources, for example, from one or more batteries. The first inverter is formed of three half bridges which are switched by PWM pulses for a space vector modulation.

Figure 3:
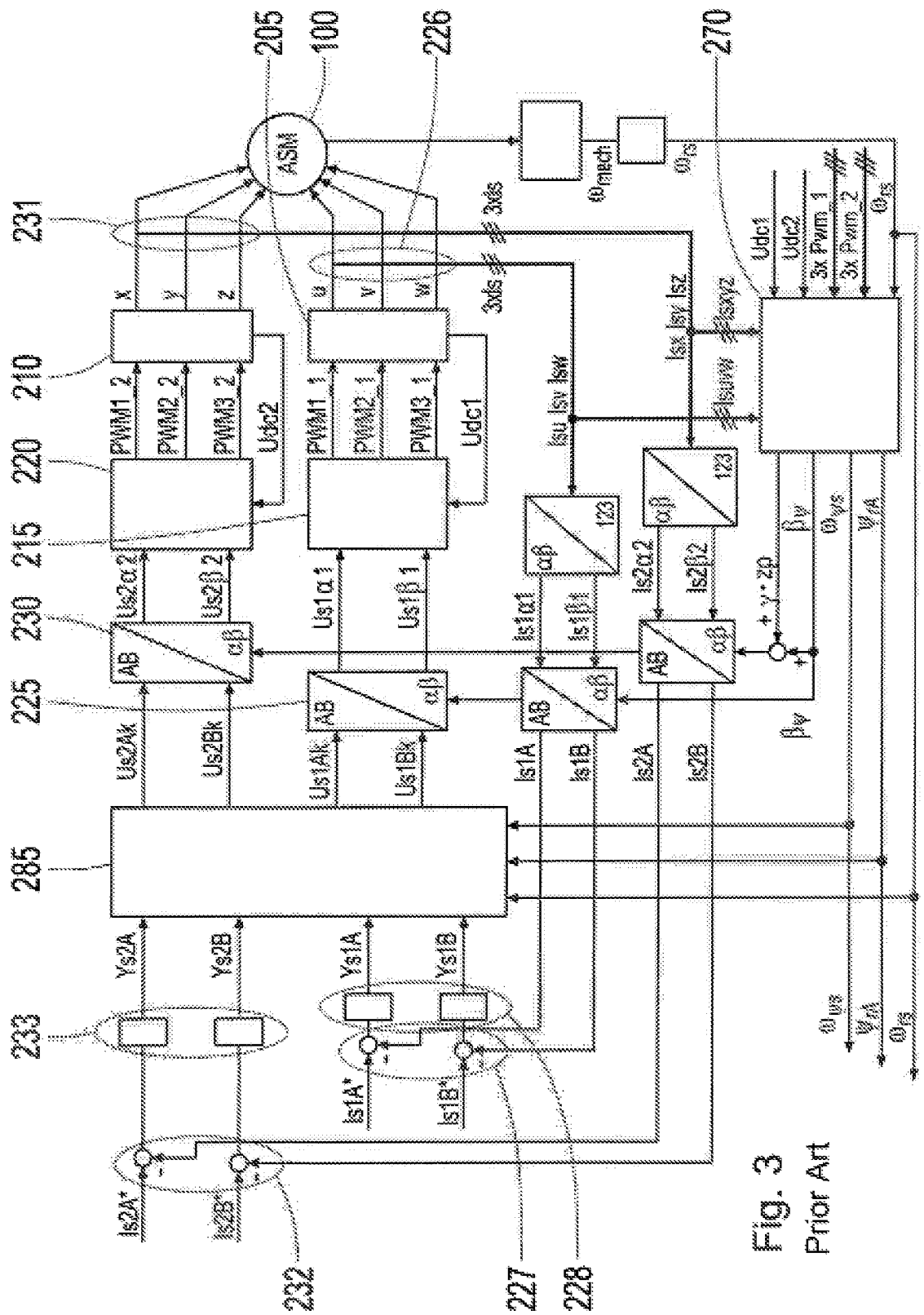
FIG. 3 is a block diagram of a closed loop field-oriented control according to the prior art.

FIG. 3 shows a block diagram of a closed loop field-oriented control according to the prior art. The asynchronous machine 100 is shown schematically. A rotor is not shown. Two stator windings are indicated. The first three-phase winding u, v, w is operated by a first inverter 205, and the second three-phase winding x, y, z is operated by a second inverter 210. The power supply of the two inverters is provided by two different independent voltage supplies UDC1 and UDC2.

Further, a first space vector modulator 215, also known as PWM space vector modulator, is shown. The space vector modulator 215 supplies a first PWM vector to the first inverter 205. The first inverter 205 is connected to a first DC voltage source UDC1. The first inverter 205 and the first space vector modulator 215 together form the first inverter device. The second space vector modulator 220 supplies a second PWM vector to the second inverter 210. The second inverter 210 is connected to a second DC voltage source UDC2. The second inverter 210 and the second space vector modulator 220 together form the second inverter device.

Further, a first transformation device 225 is shown. The first transformation device 225 supplies a first voltage vector ($U_{s1α1}$, $U_{s1β1}$) to the first inverter device or, more accurately, to the first space vector modulator 215. The first voltage vector indicates the machine voltages of the first three-phase winding in the fixed α1, β1 coordinate system, i.e., in the reference system of the first three-phase winding. The first transformation device 225 carries out the inverse Clarke transformation at the first closed loop control deviation vector ($U_{s1Ak}$, $U_{s1Bk}$) and accordingly transforms it into the first voltage vector ($U_{s1α1}$, $U_{s1β1}$). For the inverse Clarke transformation, the electrical angle $β_ψ$ of the rotor flux with respect to the fixed-stator coordinate system of the first three-phase winding (α,β) is further supplied to the first transformation device 225 by the calculation device 270. A second transformation device 230 is also shown. The second transformation device 230 supplies a second voltage vector ($U_{s2α2}$, $U_{s2β2}$) to the second inverter device or, more precisely, to the second space vector modulator 220. The second voltage vector indicates the machine voltages of the second three-phase winding in the fixed α2, β2 coordinate system, i.e., in the reference system of the second three-phase winding. The second transformation device 230 carries out the inverse Clarke transformation at the second closed loop control deviation vector ($U_{s2Ak}$, $U_{s2Bk}$) and accordingly transforms it to the first voltage vector ($U_{s2α2}$, $U_{s2β2}$). For the inverse Clarke transformation, the electrical angle $β_ψ$+γ*zp of the rotor flux with respect to the fixed stator coordinate system of the first three-phase winding (α, β) is further supplied to the first transformation device 230 by the calculation device 270.

The calculation device 270, also known as flux model, is configured to calculate battery voltages UDC1 and UDC2, PWM vectors Pwm_1 and Pwm_2, phase currents and angular velocity of the rotor flux $ω_{rs}$, at least estimations for operation variables of the asynchronous machine, namely, for the electrical angle $β_ψ$, the slip angular velocity $ω_{ψr}$, from the input quantities and to calculate the rotor flux $ψ_{rAB}$.

The following simplified differential equation is given for the rotor windings in the rotor flux coordinate system AB. It contains stator currents and rotor flux:

$$\frac{d\vec{\Psi}_{rAB}}{dt} = \left(-\frac{R_r}{L_r} \cdot \vec{\Psi}_{rAB} + jω_{rψ} \cdot \vec{\Psi}_{rAB}\right) + R_r \cdot \frac{L_m}{L_r} \cdot (\vec{I}_{s1AB} + \vec{I}_{s2AB}), \quad \text{Eq. 1}$$

where:
$ψ_{rA}$ is the rotor flux component in the A axis in the A,B coordinate system corresponding to the rotor flux amount,
$ψ_{rB}$ is the rotor flux component in the B axis in the A,B coordinate system,
$L_m$ is the magnetizing inductance [H],
$L_r$ is the rotor self-inductance [H],
$R_r$ is the rotor resistance [Ω]
$I_{s1A}$, $I_{s1B}$ are machine currents of the first three-phase winding in the A,B coordinate system (rotor flux coordinate system),
$I_{s2A}$, $I_{s2B}$ are machine currents of the second three-phase winding in the A,B coordinate system (rotor flux coordinate system),
$ω_{rψ}$: (=−$^{ψr}$) is the electrical angular velocity of the rotor with respect to the rotor flux coordinate system,
vector quantities such as $I_{s1AB}$ designate vectors from the quantities $I_{s1A}$ and $I_{s1B}$.
The rotor flux estimation is given by:

$$\frac{dΨ_{rA}}{dt} = -\frac{R_r}{L_r} \cdot Ψ_{rA} + \frac{R_r}{L_r} \cdot L_m \cdot (I_{s1A} + I_{s2A}) \quad \text{Eq. 2}$$

The slip angular velocity $ω_{ψr}/2_π$ of the asynchronous machine is given by:

$$ω_{ψr} = \frac{R_r}{L_r} \cdot L_m \cdot \frac{1}{Ψ_{rA}} \cdot (I_{s1B} + I_{s2B}) \quad \text{Eq. 3}$$

The rotor flux is obtained from Eq. 2 and the electrical angular velocity of the rotor flux with respect to α, β stator coordinate system $\omega_{\psi s}$ is obtained from Eq. 3. The electrical angle of rotor flux $\beta_\psi$ with respect to $\alpha,\beta$ stator coordinate system of the first winding uvw is obtained through integration of $\omega_{\psi s}$:

$$\beta_\psi = \int \omega_{\psi s} dt =$$

$$\int (\omega_{\psi r} + \omega_{rs}) dt = \int \left( \frac{R_r}{L_r} \cdot L_m \cdot \frac{1}{\Psi_{rA}} \cdot (I_{s1B} + I_{s2B}) + \omega_{rs} \right) dt \quad \text{Eq. 4}$$

Also shown are a first current sensor 226, a first subtractor 227, a first proportional integrator 228, also known as a PI controller, and a decoupling network 285. Collectively, the first current sensor 226, the first subtractor 227 and the first proportional integrator 228 form the first closed loop control device. The first current sensor 226 is configured to determine the phase currents of the first three-phase winding. To this end, the first current sensor 226 usually measures two phase currents in order to calculate the third phase current by Kirchoff's law in the intermediate voltage circuit. Alternatively, the first current sensor 226 can also measure all three phase currents. The determined phase currents are supplied by the first current sensor 226 as first measurement vector. The first subtractor 227 forms a difference between a first reference current vector $I_{s1AB}^*$ and the first measurement vector $I_{s1AB}$ and supplies the difference to the proportional integrator 228. From this, the proportional integrator 228 calculates a sum of two components, a first component of which is proportional to the input of the proportional integrator 228. A second component corresponds to an integral of the input of the proportional integrator 228 over a determined resetting time. The parameters of the proportional integrator 228 are suitably chosen for calculating new reference values $Y_{s1A}$ and $Y_{s1B}$ from one of the differential values between reference current $I_{s1A}$-$I_{s1A}^*$ and actual currents $I_{s1B}$-$I_{s1B}$. The decoupling network 285 is configured to calculate a first voltage vector $U_{s1AB}$ based on the new reference values $Y_{s1A}$ and $Y_{s1B}$ and supply it to the first transformation device 225.

Further, a second current sensor 231, a second subtractor 232 and a second proportional integrator 233, also known as a PI controller, are shown. Collectively, the second current sensor 231, the second subtractor 232 and the second proportional integrator 233 form the second closed loop control device. The second current sensor 231 is configured to determine the phase currents of the second three-phase winding. To this end, the second current sensor 231 usually measures two phase currents in order to calculate the third phase current by Kirchoff's law in the intermediate voltage circuit. Alternatively, the second current sensor 231 can also measure all three phase currents. The determined phase currents are supplied by the second current sensor 231 as second measurement vector. The second subtractor 231 forms a difference between a second reference current vector $I_{s2AB}^*$ and the second measurement vector $I_{s2AB}$ and supplies the difference to the proportional integrator 233. From this, the proportional integrator 233 calculates a sum of two components, a first component of which is proportional to the input of the proportional integrator 233. A second component corresponds to an integral of the input of the proportional integrator 233 over a determined resetting time. The parameters of the proportional integrator 233 are suitably chosen for calculating new reference values $Y_{s2A}$ and $Y_{s2B}$ from one of the differential values between reference current $I_{s2A}^*$-$I_{s2A}^*$ and actual currents $I_{s2B}^*$-$I_{s2B}^*$. The decoupling network 285 is configured to calculate a second voltage vector $U_{s2AB}$ based on the new reference values $Y_{s2A}$ and $Y_{s2B}$ and supply it to the second transformation device 230.

Figure 4:
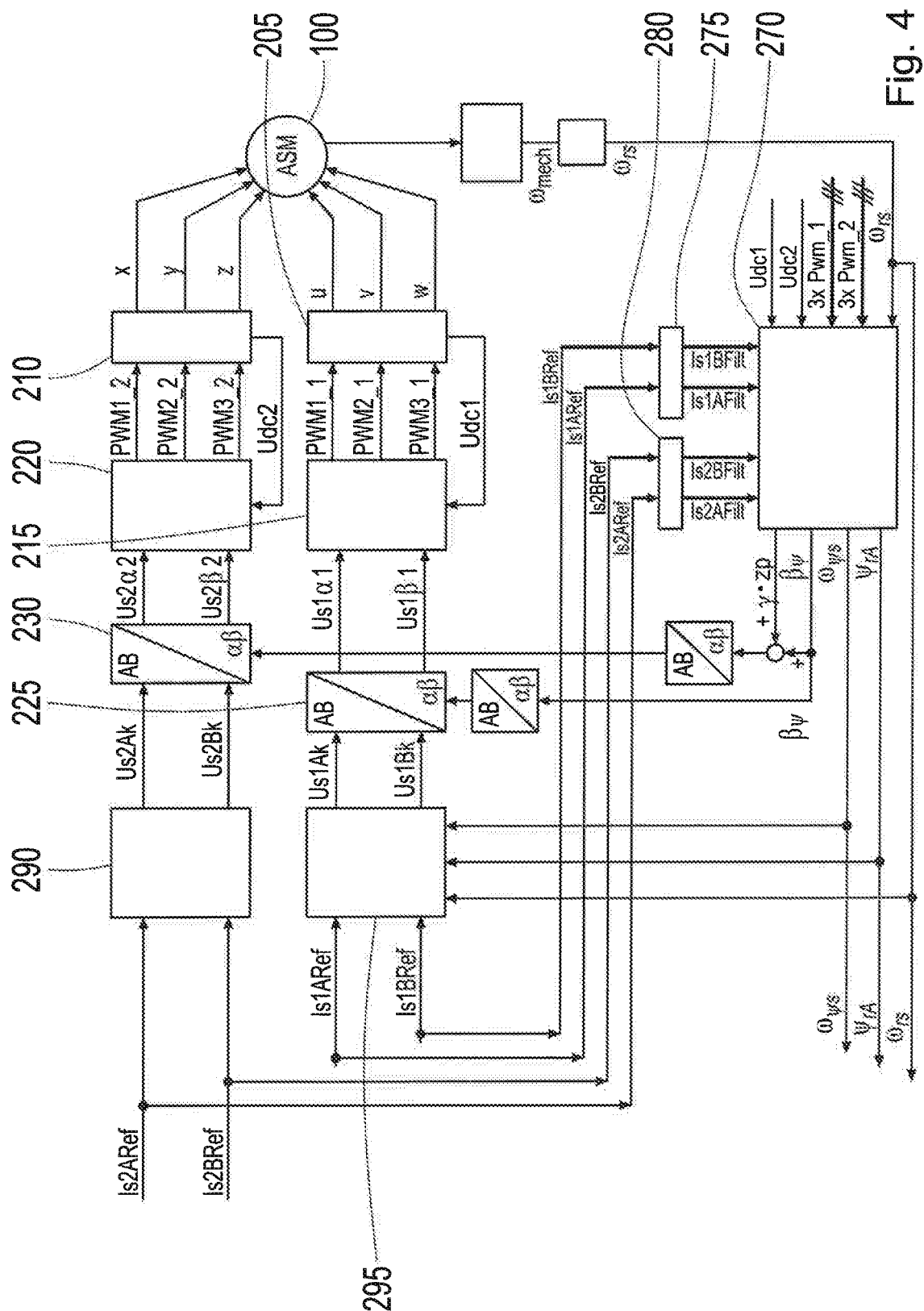
FIG. 4 is a block diagram of a device according to one aspect of the invention.

FIG. 4 shows a block diagram of a device according to an embodiment form of one aspect of the invention. The asynchronous machine 100 is shown schematically. A rotor is not shown. Two stator windings are indicated. The first three-phase winding u, v, w is operated by a first inverter 205, and the second three-phase winding x, y, z is operated by a second inverter 210. The power supply of the two inverters is provided by two different independent voltage supplies UDC1 and UDC2.

Further, the first space vector modulator 215, also known as PWM space vector modulator, is shown. The space vector modulator 215 supplies a first PWM vector to the first inverter 205. The first inverter 205 is connected to a first DC voltage source UDC1. The first inverter 205 and the first space vector modulator 215 together form the first inverter device. The second space vector modulator 220 supplies a second PWM vector to the second inverter 210. The second inverter 210 is connected to a second DC voltage source UDC2. The second inverter 210 and the second space vector modulator 220 together form the second inverter device.

Further, the first transformation device 225 is shown. The first transformation device 225 supplies a first voltage vector $(U_{s1\alpha 1}, U_{s1\beta 1})$ to the first inverter device or, more accurately, to the first space vector modulator 215. The first voltage vector indicates the machine voltages of the first three-phase winding in the fixed $\alpha 1, \beta 1$ coordinate system, i.e., in the reference system of the first three-phase winding. The first transformation device 225 carries out the inverse Clarke transformation at the first closed loop control deviation vector $(U_{s1Ak}, U_{s1Bk})$ and accordingly transforms it into the first voltage vector $(U_{s1\alpha 1}, U_{s1\beta 1})$. For the inverse Clarke transformation, the electrical angle $\beta_\psi$ of the rotor flux with respect to the fixed stator coordinate system of the first three-phase winding $(\alpha, \beta)$ is further supplied to the first transformation device 225 by the calculation device 270. A second transformation device 230 is also shown. The second transformation device 230 supplies a second voltage vector $(U_{s2\alpha 2}, U_{s2\beta 2})$ to the second inverter device or, more precisely, to the second space vector modulator 220. The second voltage vector indicates the machine voltages of the second three-phase winding in the fixed $\alpha 2, \beta 2$ coordinate system, i.e., in the reference system of the second three-phase winding. The second transformation device 230 carries out the inverse Clarke transformation at the second closed loop control deviation vector $(U_{s2Ak}, U_{s2Bk})$ and accordingly transforms it to the first voltage vector $(U_{s2\alpha 2}, U_{s2\beta 2})$. For the inverse Clarke transformation, the electrical angle $\beta_\psi + \gamma^* zp$ of the rotor flux with respect to the fixed stator coordinate system of the first three-phase winding $(\alpha, \beta)$ is further supplied to the first transformation device 230 by the calculation device 270.

The calculation device 270, also known as a flux model, is configured to calculate battery voltages UDC1 and UDC2, PWM vectors Pwm_1 and Pwm_2, phase currents, and angular velocity of the rotor flux $\omega_{rs}$, at least estimations for operation variables of the asynchronous machine, namely, for the electrical angle $\beta_\psi$, the slip angular velocity $\omega_{\psi r}$, from the input quantities and to calculate the rotor flux $\psi_{rAB}$. Since there are no measured phase currents, i.e., no first measurement vector and no second measurement vector, the calculation device 270 bases its calculations on estimated phase currents. The estimated phase currents are supplied by a first filter device 275 and a second filter device 280.

The first filter device 275 filters a first reference current vector ($I_{s1ARef}$, $I_{s1BRef}$), which was also previously designated by ($I_{s1A}*$, $I_{s1B}*$). The first filter device 275 supplies the filtered first reference current vector ($I_{s1AFilt}$, $I_{s1BFilt}$) to the calculation device 270. The first filter device 275 filters a first reference current vector ($I_{s1ARef}$, $I_{s1BRef}$), which was also previously designated by ($I_{s1A}*$, $I_{s1B}*$). The first filter device 275 supplies the filtered first reference current vector ($I_{s1AFilt}$, $I_{s1BFilt}$) to the calculation device 270. The first filter device comprises a first-order lag element, for example. Generally speaking, the filter device is configured to simulate the relationship between the first reference current vector and the phase currents in the first three-phase winding as precisely as possible.

The second filter device 280 filters a second reference current vector ($I_{s2ARef}$, $I_{s2BRef}$), which was also previously designated by ($I_{s2A}*$, $I_{s2B}*$). The second filter device 280 supplies the filtered second reference current vector ($I_{s2AFilt}$, $I_{s2BFilt}$) to the calculation device 270. The second filter device 280 filters a second reference current vector ($I_{s2ARef}$, $I_{s2BRef}$), which was also previously designated by ($I_{s2A}*$, $I_{s2B}*$). The second filter device 280 supplies the filtered second reference current vector ($I_{s2AFilt}$, $I_{s2BFilt}$) to the calculation device 270. The second filter device comprises a first-order lag element, for example. Generally speaking, the second filter device is configured to simulate the relationship between the second reference current vector and the phase currents in the second three-phase winding as precisely as possible.

Further, a first open loop control device 290 is shown. The first open loop control device supplies a first third voltage vector ($I_{s1Ak}$, $I_{s1Bk}$) in the AB coordinate system based on a first reference current vector ($I_{s1ARef}$, $I_{s1Bref}$). A second open loop control device 295 is configured to determine a second open loop control deviation vector. The second open loop control device 295 determines the second open loop control deviation vector based on estimated phase currents and filtered phase currents.

It follows for the components of the third voltage vector:

$$U_{s1A\_k} = R_{sG1} \cdot I_{s1AFs1\_k} + R_r \frac{L_m^2}{L_r^2} \cdot I_{s2AFs1\_k} - \qquad \text{Eq. 5}$$

$$\omega_{\psi s} \cdot \sigma_1 L_{s1} \cdot I_{s1BF1\_k} - \omega_{\psi s} \cdot L_{s12} \cdot I_{s2BF1\_k} - \left(\frac{L_m \cdot R_r}{L_r^2}\right) \cdot \Psi_{rA\_k}$$

where:

$$I_{s1AFs1\_k} = \left(\frac{2 \cdot T_1 - T}{2 \cdot T_1 + T}\right) \cdot I_{s1AFs1\_k-1} + \qquad \text{Eq. 6}$$

$$\left(\frac{2 \cdot T_{s11} + T}{2 \cdot T_1 + T}\right) \cdot I_{s1A\_k} - \left(\frac{2 \cdot T_{s11} - T}{2 \cdot T_1 + T}\right) \cdot I_{s1A\_k-1}$$

$$I_{s2AFs1\_k} = \left(\frac{2 \cdot T_1 - T}{2 \cdot T_1 + T}\right) \cdot I_{s2AFs1\_k-1} + \qquad \text{Eq. 7}$$

$$\left(\frac{2 \cdot T_{s12} + T}{2 \cdot T_1 + T}\right) \cdot I_{s2A\_k} - \left(\frac{2 \cdot T_{s12} - T}{2 \cdot T_1 + T}\right) \cdot I_{s2A\_k-1}$$

$$I_{s1BF1\_k} = \left(\frac{2 \cdot T_1 - T}{2 \cdot T_1 + T}\right) \cdot I_{s1BF1\_k-1} + \left(\frac{T}{2 \cdot T_1 + T}\right) \cdot (I_{s1B\_k} + I_{s1B\_k-1}) \qquad \text{Eq. 8}$$

$$I_{s2BF1\_k} = \left(\frac{2 \cdot T_1 - T}{2 \cdot T_1 + T}\right) \cdot I_{s2BF1\_k-1} + \left(\frac{T}{2 \cdot T_1 + T}\right) \cdot (I_{s1B\_k} + I_{s1B\_k-1}) \qquad \text{Eq. 9}$$

The voltage of the first winding uvw is determined in the B axis analogously, wherein the terms $$\left(\frac{L_m}{L_r}\right) \cdot \omega_{rs} \cdot \Psi_{rA}$$

are not added until the end because the mechanical time constant is greater than the electrical time constant and, therefore, changes more slowly. The voltage is obtained in the B axis for the first winding uvw:

$$U_{s1B\_k} = R_{sG1} \cdot I_{s1BFs1\_k} + R_r \frac{L_m^2}{L_r^2} \cdot I_{s2BFs1\_k} + \qquad \text{Eq. 10}$$

$$\omega_{\psi s} \cdot \sigma_1 L_{s11} \cdot I_{s1AF1\_k} + \omega_{\psi s} \cdot L_{s12} \cdot I_{s2AF1\_k} + \omega_{rs} \cdot \frac{L_m}{L_r} \cdot \Psi_{rA\_k}$$

where:

$$I_{s1BFs1\_k} = \left(\frac{2 \cdot T_2 - T}{2 \cdot T_2 + T}\right) \cdot I_{s1BFs1\_k-1} + \qquad \text{Eq. 11}$$

$$\left(\frac{2 \cdot T_{s11} + T}{2 \cdot T_2 + T}\right) \cdot I_{s1B\_k} - \left(\frac{2 \cdot T_{s11} - T}{2 \cdot T_2 + T}\right) \cdot I_{s1B\_k-1}$$

$$I_{s2BFs1\_k} = \left(\frac{2 \cdot T_2 - T}{2 \cdot T_2 + T}\right) \cdot I_{s2BFs1\_k-1} + \qquad \text{Eq. 12}$$

$$\left(\frac{2 \cdot T_{s12} + T}{2 \cdot T_2 + T}\right) \cdot I_{s2B\_k} - \left(\frac{2 \cdot T_{s12} - T}{2 \cdot T_2 + T}\right) \cdot I_{s2B\_k-1}$$

$$I_{s1AF1\_k} = \left(\frac{2 \cdot T_2 - T}{2 \cdot T_2 + T}\right) \cdot I_{s1AF1\_k-1} + \left(\frac{T}{2 \cdot T_2 + T}\right) \cdot (I_{s1A\_k} + I_{s1A\_k-1}) \qquad \text{Eq. 13}$$

$$I_{s2AF1\_k} = \left(\frac{2 \cdot T_2 - T}{2 \cdot T_2 + T}\right) \cdot I_{s2AF1\_k-1} + \left(\frac{T}{2 \cdot T_2 + T}\right) \cdot (I_{s2A\_k} + I_{s2A\_k-1}) \qquad \text{Eq. 14}$$

The voltages of the second winding xyz are determined in the AB coordinate system in an analogous manner, wherein a desired time constant $T_3$ ($T_4$, respectively) can be adjusted. The following is given for the A axis:

$$U_{s2A\_k} = R_{sG2} \cdot I_{s2AFs2\_k} + R_r \frac{L_m^2}{L_r^2} \cdot I_{s1AFs2\_k} - \qquad \text{Eq. 15}$$

$$\omega_{\psi s} \cdot \sigma_2 L_{s22} \cdot I_{s2BF2\_k} - \omega_{\psi s} \cdot L_{s21} \cdot I_{s1BF2\_k} - \left(\frac{L_m \cdot R_r}{L_r^2}\right) \cdot \Psi_{rA\_k}$$

wherein:

$$I_{s2AFs2\_k} = \left(\frac{2 \cdot T_3 - T}{2 \cdot T_3 + T}\right) \cdot I_{s2AFs2\_k-1} + \qquad \text{Eq. 16}$$

$$\left(\frac{2 \cdot T_{s22} + T}{2 \cdot T'_3 + T}\right) \cdot I_{s2A\_k} - \left(\frac{2 \cdot T_{s22} - T}{2 \cdot T_3 + T}\right) \cdot I_{s2A\_k-1}$$

$$I_{s1AFs2\_k} = \left(\frac{2 \cdot T_3 - T}{2 \cdot T_3 + T}\right) \cdot I_{s1AFs2\_k-1} + \qquad \text{Eq. 17}$$

$$\left(\frac{2 \cdot T_{s21} + T}{2 \cdot T'_3 + T}\right) \cdot I_{s1A\_k} - \left(\frac{2 \cdot T_{s21} - T}{2 \cdot T_3 + T}\right) \cdot I_{s1A\_k-1}$$

$$I_{s2BF2\_k} = \left(\frac{2 \cdot T_3 - T}{2 \cdot T_3 + T}\right) \cdot I_{s2BF2\_k-1} + \left(\frac{T}{2 \cdot T_3 + T}\right) \cdot (I_{s2B\_k} + I_{s2B\_k-1}) \qquad \text{Eq. 18}$$

$$I_{s1BF2\_k} = \left(\frac{2 \cdot T_3 - T}{2 \cdot T_3 + T}\right) \cdot I_{s1BF2\_k-1} + \left(\frac{T}{2 \cdot T_3 + T}\right) \cdot (I_{s1B\_k} + I_{s1B\_k-1}) \qquad \text{Eq. 19}$$

The following is given for the B axis of the second winding xyz:

$$U_{s2B\_k} = R_{sG2} \cdot I_{s2BFs2\_k} + R_r \frac{L_m^2}{L_r^2} \cdot I_{s1BFs2\_k} +$$
$$\omega_{\psi s} \cdot \sigma_2 L_{s22} \cdot I_{s2AF2\_k} + \omega_{\psi s} \cdot L_{s21} \cdot I_{s1AF2\_k} + \omega_{rs} \cdot \frac{L_m}{L_r} \cdot \Psi_{rA\_k} \quad \text{Eq. 20}$$

wherein:

$$I_{s2BFs2\_k} = \left(\frac{2 \cdot T_4 - T}{2 \cdot T_4 + T}\right) \cdot I_{s2BFs2\_k-1} + \quad \text{Eq. 21}$$
$$\left(\frac{2 \cdot T_{s22} + T}{2 \cdot T_4 + T}\right) \cdot I_{s2B\_k} - \left(\frac{2 \cdot T_{s22} - T}{2 \cdot T_4 + T}\right) \cdot I_{s2B\_k-1}$$

$$I_{s1BFs2\_k} = \left(\frac{2 \cdot T_4 - T}{2 \cdot T_4 + T}\right) \cdot I_{s1BFs2\_k-1} + \quad \text{Eq. 22}$$
$$\left(\frac{2 \cdot T_{s21} + T}{2 \cdot T_4 + T}\right) \cdot I_{s1B\_k} - \left(\frac{2 \cdot T_{s21} - T}{2 \cdot T_4 + T}\right) \cdot I_{s1B\_k-1}$$

$$I_{s2AF2\_k} = \left(\frac{2 \cdot T_4 - T}{2 \cdot T_4 + T}\right) \cdot I_{s2AF2\_k-1} + \left(\frac{T}{2 \cdot T_4 + T}\right) \cdot (I_{s2A\_k} + I_{s2A\_k-1}) \quad \text{Eq. 23}$$

$$I_{s1AF2\_k} = \left(\frac{2 \cdot T_4 - T}{2 \cdot T_4 + T}\right) \cdot I_{s1AF2\_k-1} + \left(\frac{T}{2 \cdot T_4 + T}\right) \cdot (I_{s1A\_k} + I_{s1A\_k-1}) \quad \text{Eq. 24}$$

wherein:
Us1A(k), Us1Bk are the required voltages for A axis and B axis of the first three-phase winding uvw (actual) [V],
Is1A(k), Is1B(k) are the current reference values for A axis and B axis of the first three-phase winding uvw (actual),
Is1A(k−1), Ys1B(k−1) are the current reference values for A axis and B axis of the first three-phase winding uvw (one scanning step previous),
Is1AF1($k$) is the filtered current reference value for A axis of the first three-phase winding uvw with time constant T2 (actual),
Is1AF1($k$−1) is the filtered current reference value for A axis of the first three-phase winding uvw with time constant T2 (one scanning step previous),
Is2AF1($k$) is the filtered current reference value for A axis of the second three-phase winding xyz with time constant T2 (actual),
Is2AF1($k$−1) is the filtered current reference value for A axis of the second three-phase winding xyz with time constant T2 (one scanning step previous),
Is1BF1($k$) is the filtered current reference value for B axis of the first three-phase winding uvw with time constant T1 (actual),
Is1BF1($k$−1) is the filtered current reference value for B axis of the first three-phase winding uvw with time constant T1 (one scanning step previous),
Is2BF1($k$) is the filtered current reference value for B axis of the second three-phase winding xyz with time constant T1 (actual),
Is2BF1($k$−1) is the filtered current reference value for B axis of the second three-phase winding xyz with time constant T1 (one scanning step previous),
Is1AFs1($k$) is the recalculated current reference value in A axis of the first three-phase winding uvw according to Eq. 6 (actual),
Is1AFs1($k$−1) is the recalculated current reference value in A axis of the first three-phase winding uvw according to Eq. 6 (one scanning step previous),
Is2AFs1($k$) is the recalculated current reference value in A axis of the second three-phase winding xyz according to Eq. 7 (actual),
Is2AFs1($k$−1) is the recalculated current reference value in A axis of the second three-phase winding xyz according to Eq. 7 (one scanning step previous),
Is1BFs1($k$) is the recalculated current reference value in B axis of the first three-phase winding uvw according to Eq. 11 (actual),
Is1BFs1($k$−1) is the recalculated current reference value in B axis of the first three-phase winding uvw according to Eq. 11 (one scanning step previous),
Is2BFs1($k$) is the recalculated current reference value in B axis of the second three-phase winding xyz according to Eq. 12 (actual),
Is2BFs1($k$−1) is the recalculated current reference value in B axis of the second three-phase winding xyz according to Eq. 12 (one scanning step previous),
Us2A(k), Us2B(k) are the required voltages for A axis and B axis of the second three-phase winding xyz (actual) [V],
Is2A(k), Is2B(k) are the current reference values for A axis and B axis of the second three-phase winding xyz (actual),
Is2A(k−1), Is2B(k−1) are the current reference values for A axis and B axis of the second three-phase winding xyz (one scanning step previous),
Is2AF2($k$) is the filtered current reference value for A axis of the second three-phase winding xyz with time constant T4 (actual),
Is2AF2($k$−1) is the filtered current reference value for A axis of the second three-phase winding xyz with time constant T4 (one scanning step previous),
Is1AF2($k$) is the filtered current reference value for A axis of the first three-phase winding uvw with time constant T4 (actual),
Is1AF2($k$−1) is the filtered current reference value for A axis of the first three-phase winding uvw with time constant T4 (one scanning step previous),
Is2BF2($k$) is the filtered current reference value for B axis of the second three-phase winding xyz with time constant T3 (actual),
Is2BF2($k$−1) is the filtered current reference value for B axis of the second three-phase winding xyz with time constant T3 (one scanning step previous),
Is1BF2($k$) is the filtered current reference value for B axis of the first three-phase winding uvw with time constant T3 (actual),
Is1BF2($k$−1) is the filtered current reference value for B axis of the first three-phase winding uvw with time constant T3 (one scanning step previous),
Is2AFs1($k$) is the recalculated current reference value in A axis of the second three-phase winding xyz according to Eq. 16 (actual),
Is2AFs2($k$−1) is the recalculated current reference value in A axis of the second three-phase winding xyz according to Eq. 16 (one scanning step previous),
Is1AFs2($k$) is the recalculated current reference value in A axis of the first three-phase winding uvw according to Eq. 17 (actual),
Is1AFs2($k$−1) is the recalculated current reference value in A axis of the first three-phase winding uvw according to Eq. 17 (one scanning step previous),
Is2BFs2($k$) is the recalculated current reference value in B axis of the second three-phase winding xyz according to Eq. 21 (actual),
Is2BFs2($k$−1) is the recalculated current reference value in B axis of the second three-phase winding xyz according to Eq. 21 (one scanning step previous),
Is1BFs2($k$) is the recalculated current reference value in B axis of the first three-phase winding uvw according to Eq. 22 (actual), Is1BFs2(k−1) is the recalculated current reference value in B axis of the first three-phase winding uvw according to Eq. 22 (one scanning step previous),
Rs1 is the stator resistance of the first three-phase winding uvw [Ω],
Rs2 is the stator resistance of the second three-phase winding uvw [Ω],
Rr is the rotor resistance [Ω],
Lls1 is the leakage inductance of the first three-phase winding uvw in the stator [H],
Lls2 is the leakage inductance of the second three-phase winding xyz in the stator [H],
Llm is the common leakage inductance of the two windings uvw and xyz in the stator [H],
Lm is the magnetizing inductance between stator and rotor [H],
Ls11 is the total stator self-inductance of the first three-phase winding uvw [H],
Ls22 is the total stator self-inductance of the second three-phase winding xyz [H],
Lr is the rotor self-inductance [H],
Llr is the rotor self-inductance [H],
σ1 is the leakage coefficient of the first three-phase winding uvw, where $$\sigma 1 = \frac{L_{s11} \cdot L_r - L_m^2}{L_{s11} \cdot L_r}$$

σ2 is the leakage coefficient of the second three-phase winding xyz, where $$\sigma 2 = \frac{L_{s22} \cdot L_r - L_m^2}{L_{s22} \cdot L_r}$$

RsG1 is the total resistance in the first three-phase winding uvw [Ω], where $$R_{sG1} = R_{s1} + R_r \frac{L_m^2}{(L_m + L_{lr})^2}$$

RsG2 is the total resistance in the second three-phase winding xyz [Ω], where $$R_{sG2} = R_{s2} + R_r \frac{L_m^2}{(L_m + L_{lr})^2}$$

RsG12, RsG21 is the resistance due to the influence of the first three-phase winding uvw on the second three-phase winding xyz [Ω], where $$R_{sG12} = R_{sG21} = R_r \frac{L_m^2}{(L_m + L_{lr})^2}$$

Ts11 is the electrical time constant of the machine for the first three-phase winding uvw (=Ls11/RsG1) [sec],
Ts22 is the electrical time constant of the machine for the second three-phase winding xyz (=Ls22/RsG2) [sec],
Ts12 is the electrical time constant of the machine due to the influence of the second three-phase winding xyz on the first three-phase winding uvw (=Ls21/RsG21) [sec],
Ts12 is the electrical time constant of the machine due to the influence of the first three-phase winding uvw on the second three-phase winding xyz (=Ls12/RsG12) [sec],
T is the utilized controller scanning step [sec],
Us1A, Us1B are the machine voltages of the first three-phase winding in A,B-coordinate system (rotor flux coordinate system) [V],
Us2A, Us2B are the machine voltages of the second three-phase winding in A,B-coordinate system (rotor flux coordinate system) [V],
Is1A, Is1B are the machine currents of the first three-phase winding in A,B-coordinate system (rotor flux coordinate system) [A],
Is2A, Is2B are the machine currents of the second three-phase winding in A,B-coordinate system (rotor flux coordinate system) [A],
ψrA is the A component of the rotor flux of the machine (corresponds to the amount of rotor flux) [Vs],
ψrB is the B component of the rotor flux of the machine (=0 when the rotor flux is correctly transformed) [Vs],
$\beta_\psi$ is the electrical angle of the rotor flux with respect to the fixed-stator coordinate system of the first three-phase winding (α,β) [rad],
Zp is the number of pole pairs of the machine,
n is the speed of the rotor (or of the machine) [RPM],
$\omega_{\psi s}$ (=−$\omega_{s\psi}$) is the electrical angular velocity of the rotor flux with respect to the fixed stator coordinate system) [rad/s],
$\omega_{rs}$ (=−$\omega_{sr}$) is the electrical angular velocity of the rotor with respect to the fixed stator coordinate system, (=2*π*n/60) [rad/s],
$\omega_{r\psi}$(=−$\omega_{\psi r}$) is the electrical angular velocity of the rotor with respect to the rotor flux coordinate system, (=2*π*$f_{slip}$) [rad/s],
$f_{slip}$ is the slip frequency between rotor frequency and rotor flux frequency [Hz],
Isuvw: phase currents of the first three-phase winding (uvw) of the 6-phase machine [A],
Isxyz: phase currents of the second three-phase winding (xyz) of the 6-phase machine [A],
Udc1 is the intermediate voltage circuit (corresponds in some applications in the automobile industry to the battery voltage) for supplying the first three-phase winding (uvw) of the 6-phase machine [V],
Udc2 is the intermediate voltage circuit (corresponds in some applications in the automobile industry to the battery voltage) for supplying the second three-phase winding (xyz) of the 6-phase machine [V],
PWM123_1 are the PWM values for driving inverter 1 for the first three-phase winding,
PWM123_2 are the PWM values for driving inverter 2 for the second three-phase winding;
Us1α1, Us1β1 are the machine voltages of the first three-phase winding in fixed α1, β1 coordinate system (reference system of the first three-phase winding) [V],
Us2α2, Us2β2 are the machine voltages of the second three-phase winding in fixed α2, β2 coordinate system (reference system of the second three-phase winding) [V],
Is1α1, Is1β1 are machine currents of the first three-phase winding in fixed α1, β1 coordinate system (reference system of the first three-phase winding) [A],
Is2α2, Is2β2 are machine currents of the second three-phase winding in fixed α2, β2 coordinate system (reference system of the second three-phase winding) [A].

Figure 5:
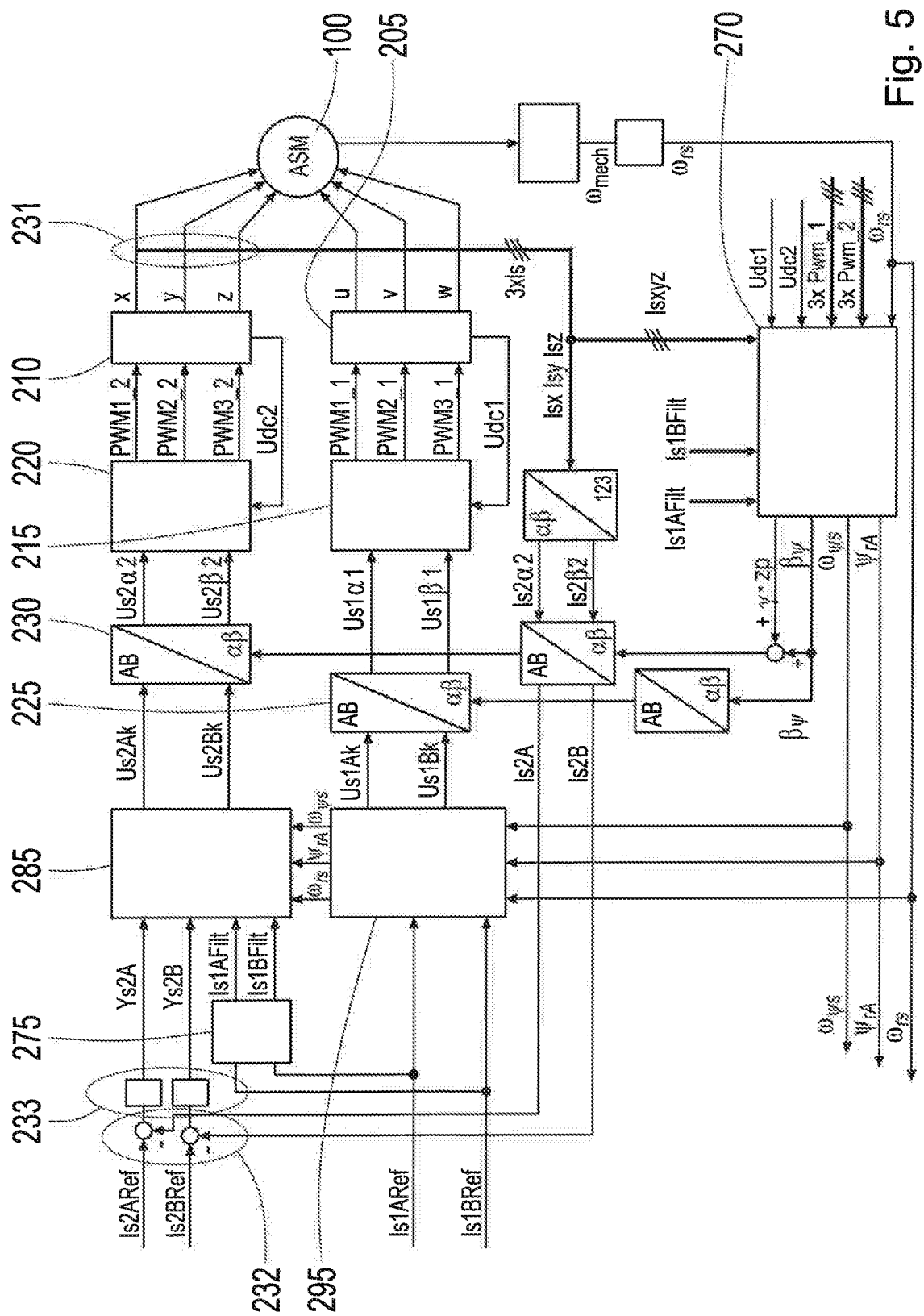
FIG. 5 is a block diagram of a device according to one aspect of the invention.

FIG. 5 shows a block diagram of a device according to an alternative embodiment form of the invention.

The asynchronous machine 100, the first inverter 205, the second inverter 210, the first space vector modulator 215 and the second space vector modulator 220 are shown as in FIGS. 3 and 4.

Further, a second current sensor 231, a second subtractor 232 and a second proportional integrator 233, which can be designated collectively as a second closed loop control device, are shown as in FIG. 3. The first filter device 275 is also shown as in FIG. 4.

Further, the calculation device 270 is shown. The calculation device 270, also known as a flux model, is configured to calculate battery voltages UDC1 and UDC2, PWM vectors Pwm_1 and Pwm_2, filtered first reference current vectors, second measurement vectors and angular velocity of the rotor flux $\omega_{rs}$, at least estimations for operation variables of the asynchronous machine, namely, for the electrical angle $\beta_\psi$, the slip angular velocity $\omega_{\psi r}$, from the input quantities and to calculate the rotor flux $\psi_{rAB}$. The filtered first reference current vector is supplied by a first filter device 275, and the second measurement vector is supplied by a second current sensor 231.

Further, the first transformation device 225 is shown. The first transformation device 225 transforms the first open loop control deviation vector ($U_{s1Ak}$, $U_{s1Bk}$) to a third voltage vector ($U_{s1\alpha1}$, $U_{s1\beta1}$) and supplies it to the first inverter device or, more accurately, to the first space vector modulator 215. Further, a second transformation device 230 is shown. The second transformation device 230 supplies the second voltage vector ($U_{s2\alpha2}$, $U_{s2\beta2}$) to the second inverter device or, more precisely, to the second space vector modulator 220. The second transformation device 230 carries out the inverse Clarke transformation at the second closed loop control deviation vector ($U_{s2Ak}$, $U_{s2Bk}$) and accordingly transforms it to the first voltage vector ($U_{s2\alpha2}$, $U_{s2\beta2}$).

Generally speaking, FIG. 5 shows a block diagram of a system for operating an asynchronous machine, wherein the first three-phase winding is controlled by an open loop field-oriented control and the second three-phase winding is regulated by a closed loop field-oriented control.

Figure 6:
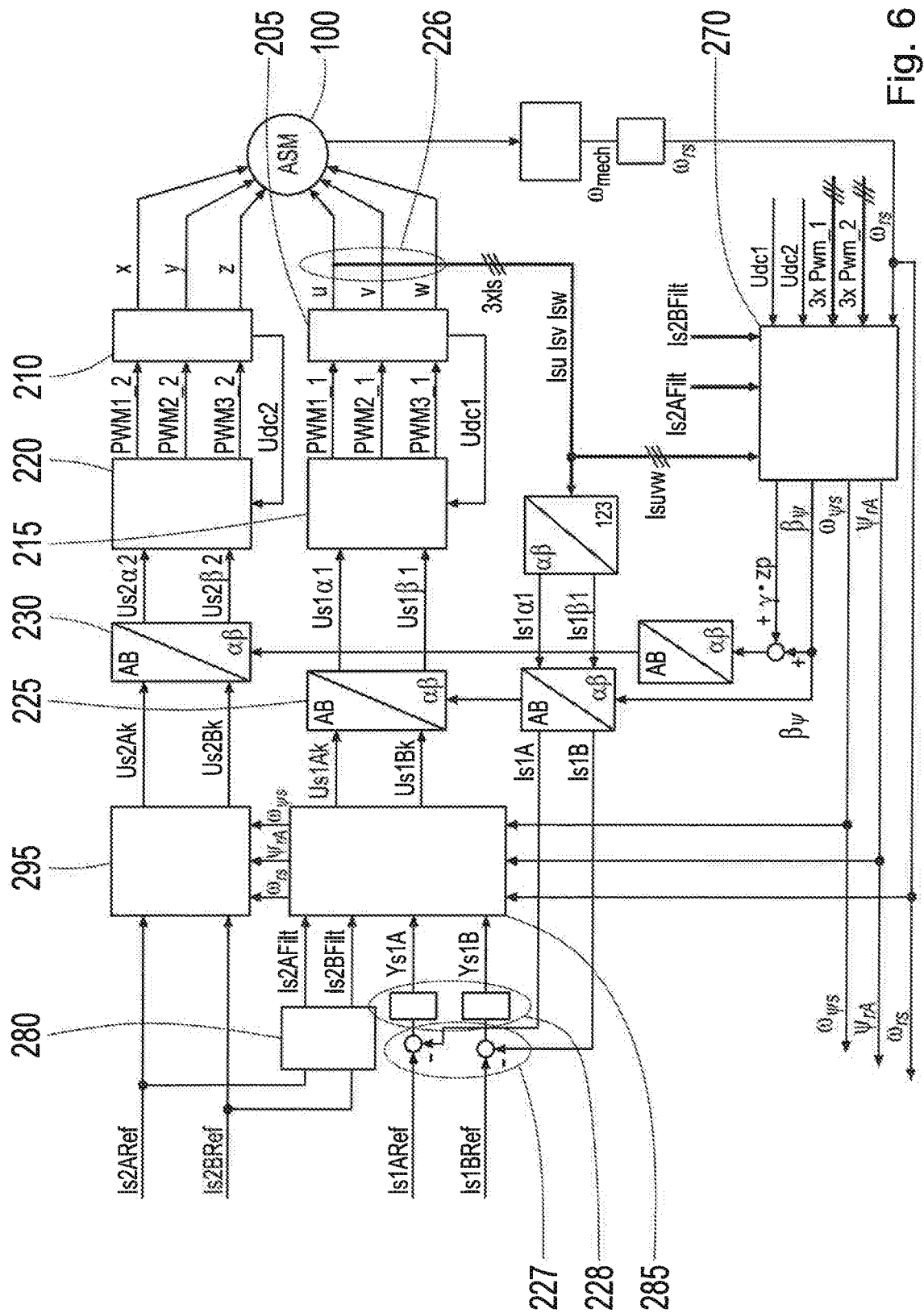
FIG. 6 is a block diagram of a device according to one aspect of the invention.

FIG. 6 shows a block diagram of a device according to an alternative embodiment form of the invention.

The asynchronous machine 100, the first inverter 205, the second inverter 210, the first space vector modulator 215 and the second space vector modulator 220 are shown as in FIGS. 3 and 4.

Further, a first current sensor 226, a first subtractor 227 and a first proportional integrator 228, which can be designated collectively as a first closed loop control device, are shown as in FIG. 3. A second filter device 275 is also shown as in FIG. 4.

Further, the calculation device 270 is shown. The calculation device 270, also known as flux model, is configured to calculate battery voltages UDC1 and UDC2, PWM vectors Pwm_1 and Pwm_2, filtered second reference current vectors, first measurement vectors and angular velocity of the rotor flux $\omega_{rs}$, at least estimations for operation variables of the asynchronous machine, namely, for the electrical angle $\beta_\psi$, the slip angular velocity $\omega_{\psi r}$, from the input quantities and to calculate the rotor flux $\psi_{rAB}$. The filtered second reference current vector is supplied by a second filter device 280, and the first measurement vector is supplied by a first current sensor 226.

Further, the first transformation device 225 is shown. The first transformation device 225 transforms the first closed loop control deviation vector ($U_{s1Ak}$, $U_{s1Bk}$) to a first voltage vector ($U_{s1\alpha1}$, $U_{s1\beta1}$) and supplies it to the first inverter device or, more accurately, to the first space vector modulator 215. Further, a second transformation device 230 is shown. The second transformation device 230 supplies the fourth voltage vector ($U_{s2\alpha2}$, $U_{s2\beta2}$) to the second inverter device or, more precisely, to the second space vector modulator 220. The second transformation device 230 carries out the inverse Clarke transformation at the second open loop control deviation vector ($U_{s2Ak}$, $U_{s2Bk}$) and accordingly transforms it to the fourth voltage vector ($U_{s2\alpha2}$, $U_{s2\beta2}$).

Generally speaking, FIG. 6 shows a block diagram of a system for operating an asynchronous machine, wherein the first three-phase winding is regulated by a closed loop field-oriented control and the second three-phase winding is controlled by an open loop field-oriented control.

Figure 7:
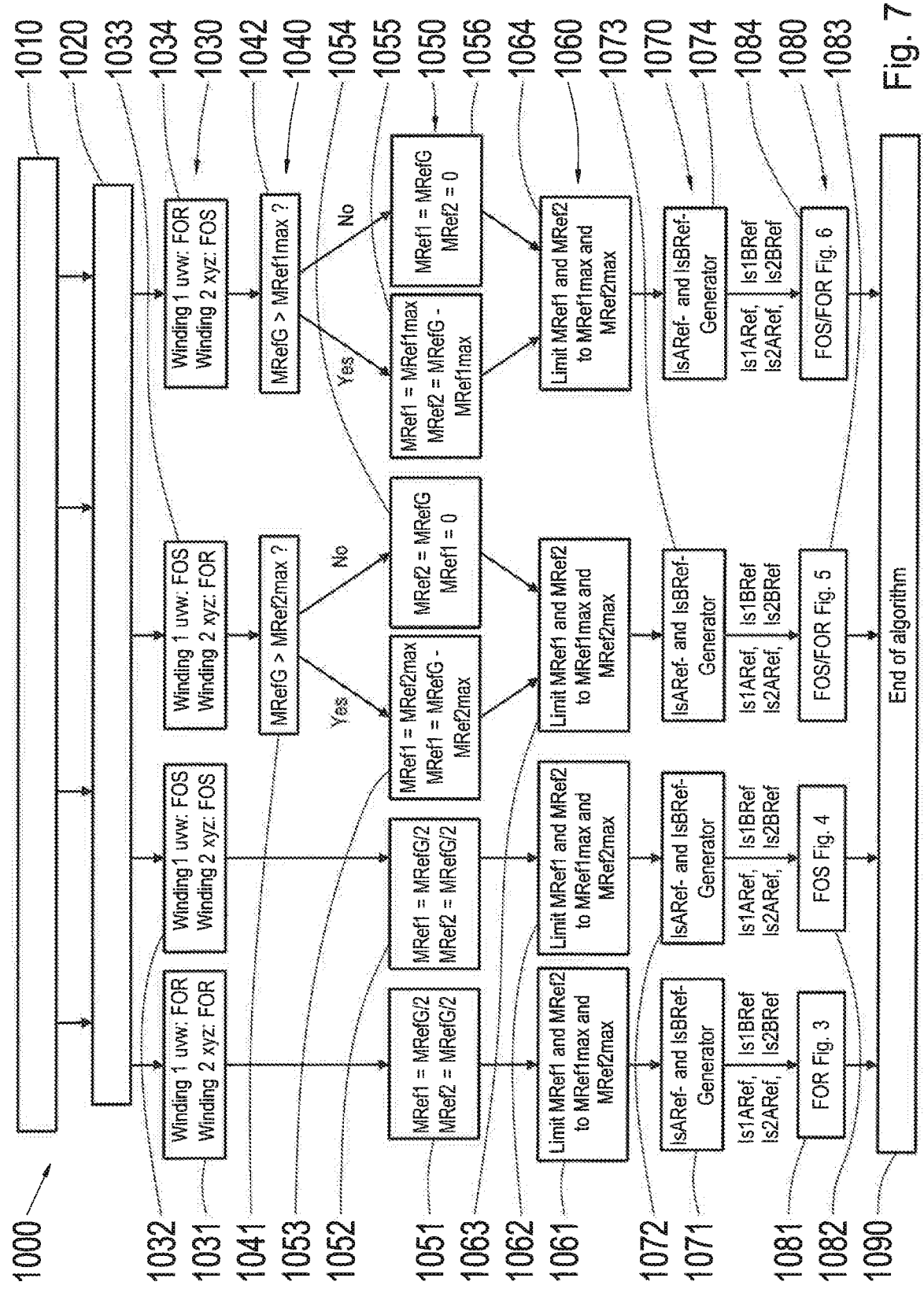
FIG. 7 is a schematic flowchart of a partial aspect of the method.

FIG. 7 shows a schematic flowchart of a partial aspect of the method 100 according to the invention.

The method starts in step 1010.

In step 1020, the path the method 1000 will take in step 1030 is decided upon depending on which winding FOS (open loop field-oriented control) or FOR (closed loop field-oriented control) is used.

If FOR is used for the first three-phase winding and FOR is used for the second three-phase winding, the method proceeds in step 1031. If FOS is used for the first three-phase winding and FOS is used for the second three-phase winding, the method proceeds in step 1032. If FOS is used for the first three-phase winding and FOR is used for the second three phase winding, the method proceeds in step 1033. If FOR is used for the first three-phase winding and FOS is used for the second three-phase winding, the method proceeds in step 1034.

In step 1050, the reference torque is divided between the windings. Step 1031 is followed by step 1051, wherein the reference torque is divided in half between the two windings. Step 1032 is followed by step 1052, wherein the reference torque is divided in half between the two windings. Step 1033 is followed by step 1041, wherein it is decided whether or not the reference torque is greater than a maximum torque of the second three-phase winding. If the reference torque is greater than a maximum torque of the second three-phase winding, the method proceeds with step 1053, wherein the second winding is operated at the maximum torque of the second winding, and the first winding is operated with the remaining torque. Otherwise, the method proceeds with step 1054, wherein the entire torque is allotted to the second winding. Step 1034 is followed by step 1042, wherein it is decided whether or not the reference torque is greater than a maximum torque of the first three-phase winding. If the reference torque is greater than a maximum torque of the first three-phase winding, the method proceeds with step 1055, wherein the first winding is operated with the maximum torque of the first winding and the second winding is operated with the remaining torque. Otherwise, the method proceeds with step 1056, wherein the entire torque is allotted to the first winding.

In step 1060, the reference torque is limited to the maximum permissible torque. In steps 1061, 1062, 1063 and 1064, the torque of the first winding is limited to the maximum torque of the first winding, and the torque of the second winding is limited to the maximum torque of the second winding.

In step 1070, reference current vectors are generated.

In step 1080, the asynchronous machine is operated. The asynchronous machine is operated in step 1081 with a device according to FIG. 3, the asynchronous machine is operated in step 1082 with a device according to FIG. 4, the asynchronous machine is operated in step 1083 with a device according to FIG. 5, the asynchronous machine is operated in step 1084 with a device according to FIG. 6.

In step 1090, the method ends.

Figure 8:
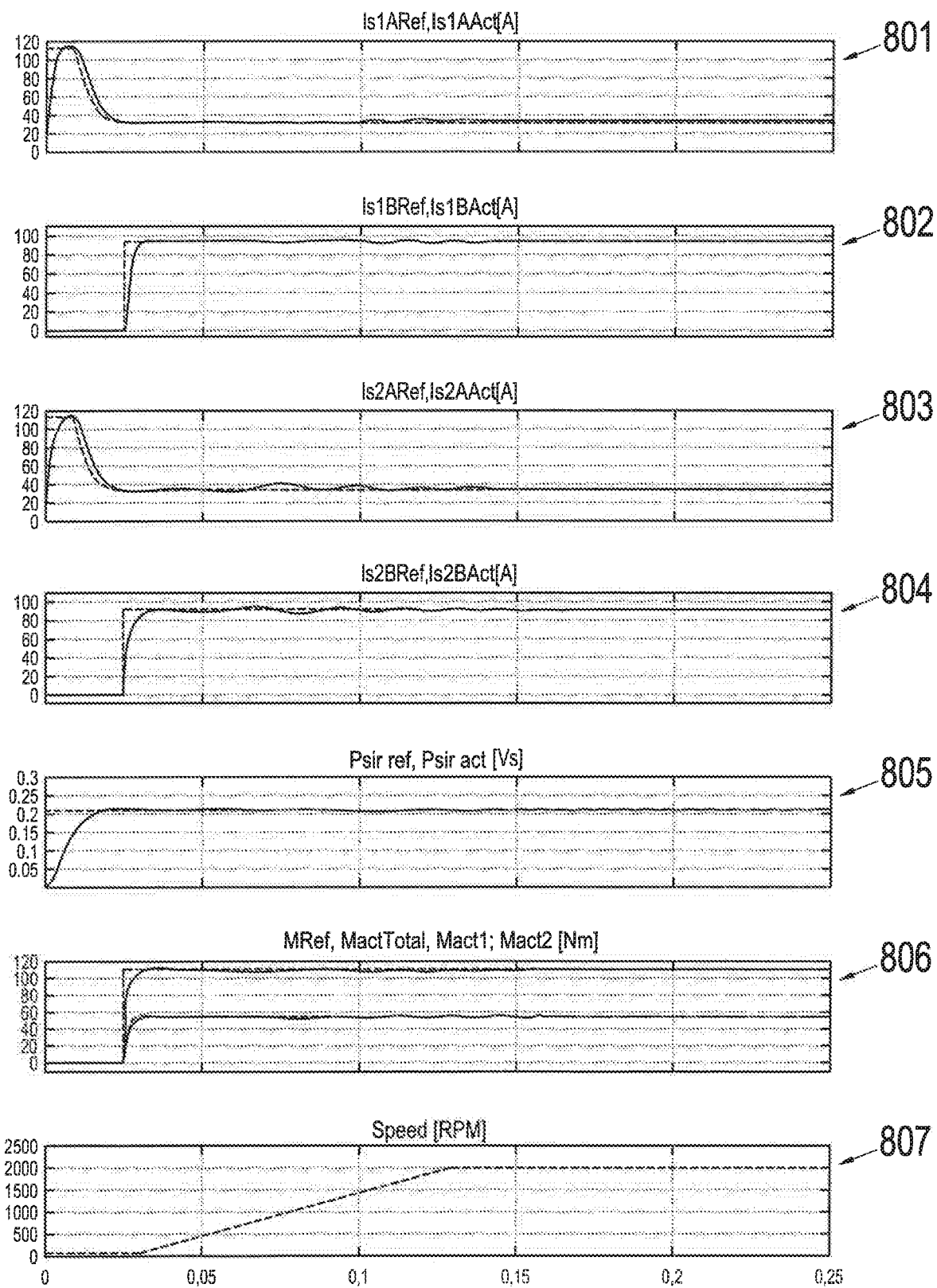
FIG. 8 is a current profile of an asynchronous machine operated according to one aspect of the invention.

FIG. 8 shows the current profile of an asynchronous machine which is operated according to one aspect the invention.

The simulation results for the actuation of a 6-phase ASM machine with the actuation concept according to FIG. 4 are shown.

Diagram 801 shows the profile of the reference currents and actual currents in A axis (flux-forming component) for the first winding of the machine (u,v,w) in amperes.

Diagram 802 shows the profile of the reference currents and actual currents in B axis (torque-forming component) for the first winding of the machine (u,v,w) in amperes.

Diagram 803 shows the profile of the reference currents and actual currents in A axis (flux-forming component) for the second winding of the machine (x, y, z) in amperes.

Diagram 804 shows the profile of the reference currents and actual currents in B axis (torque-forming component) for the second winding of the machine (x, y, z) in amperes.

Diagram 805 shows the profile of the reference value and actual value of the rotor flux $\psi_{rA}$ in Webers.

Diagram 806 shows the profile of the partial torques of the two windings M1 (from three-phase winding u, v, w) and M2 (from three-phase winding x, y, z) and the total torque Mtotal in newton meters.

Diagram 807 shows the speed profile in revolutions per minute.

The machine was accelerated to a speed of 2000 RPM. At time t=0.00 s, the flux was built up to its rated value. At time t=0.025 s, a load step was carried out in both parts of the machine. Battery voltage Udc1 and battery voltage Udc2 are different (Udc1=180 V and Udc2=225 V).

As depicted, the maximum torque is demanded, and at time t1=0 s only winding x, y, z is actuated with FOS and winding u, v, w is actuated with FOR. The actuation concept therefore corresponds to that shown in FIG. 6. At time t=0.1 s, winding u, v, w is also actuated with FOS. The actuation concept according to FIG. 4 is now switched to. The two windings u, v, w and x, y, z are simultaneously operated with FOS.

It can be seen that currents Is1A, Is1B, Is2A and Is2B contain small deviations. Currents Is1A and Us1B can continue to be measured up to time t=0.1 s and are regulated. They agree with their reference values. The maximum torque is adjusted. Small deviations are to be seen in the x, y, z winding because of FOS, and somewhat larger deviations are to be seen after t1=0.1 in both windings because of FOS. In addition, it can be observed that the currents (Is1A, Is1B, Is2A, Is2B) run steadily and the interactions between them are optimally compensated through the FOS and the decoupling network. The phase currents of the two windings are sine-shaped and have the same amplitude.

Figure 9:
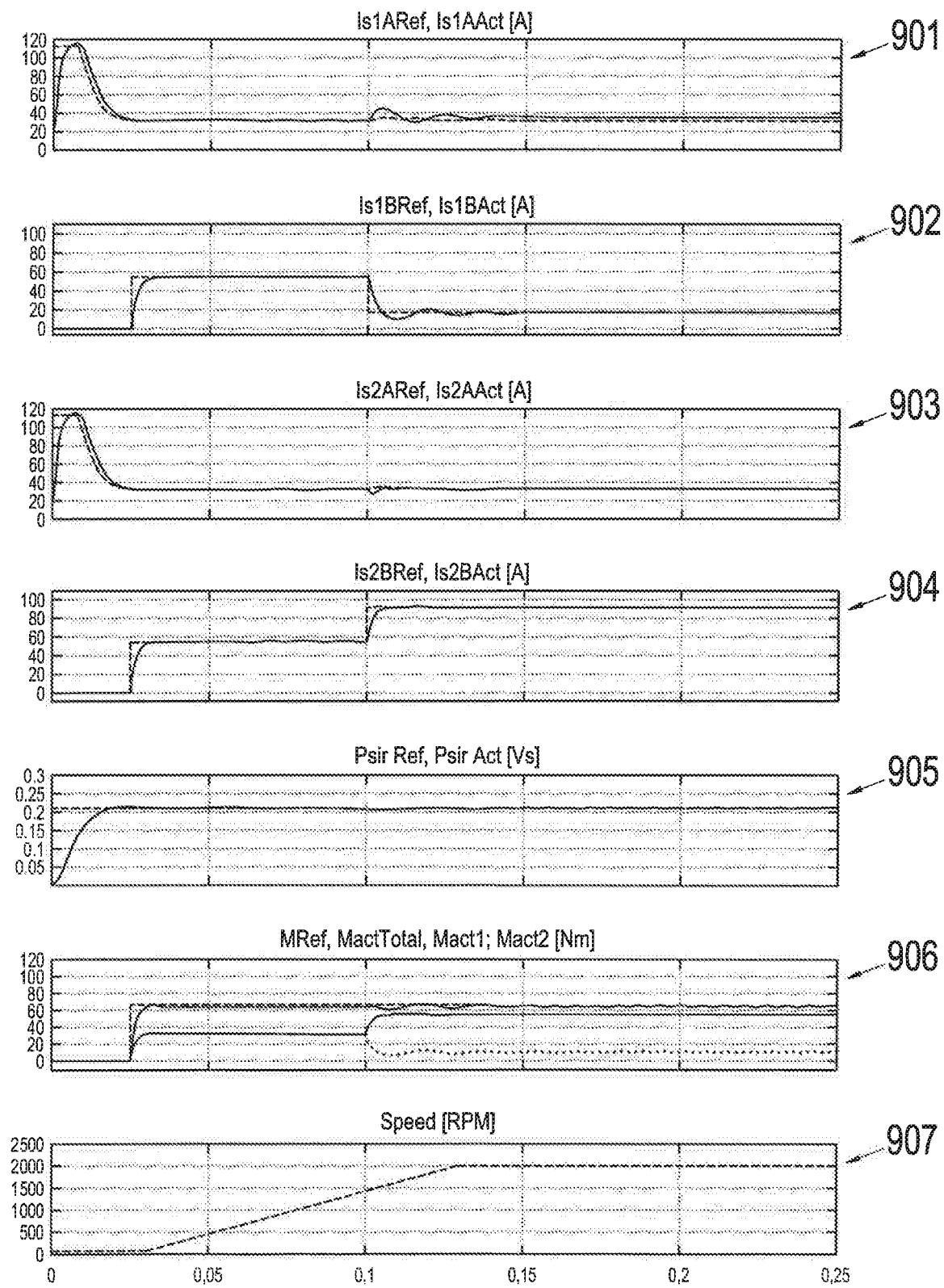
FIG. 9 is a current profile of an asynchronous machine operated according to one aspect of the invention.

FIG. 9 shows the current profile of an asynchronous machine which is operated according to one aspect of the invention.

The simulation results for the actuation of a 6-phase ASM machine with the actuation concept according to FIG. 5 are shown.

Diagram 901 shows the profile of the reference currents and actual currents in A axis (flux-forming component) for the first winding of the machine (u,v,w) in amperes.

Diagram 902 shows the profile of the reference currents and actual currents in B axis (torque-forming component) for the first winding of the machine (u,v,w) in amperes.

Diagram 903 shows the profile of the reference currents and actual currents in A axis (flux-forming component) for the second winding of the machine (x, y, z) in amperes.

Diagram 904 shows the profile of the reference currents and actual currents in B axis (torque-forming component) for the second winding of the machine (x, y, z) in amperes.

Diagram 905 shows the profile of the reference value and actual value of the rotor flux $\psi_{rA}$ in webers.

Diagram 906 shows the profile of the partial torques of the two windings M1 (from three-phase winding u, v, w) and M2 (from three-phase winding x, y, z) and the total torque Mtotal in newton meters.

Diagram 907 shows the speed profile in revolutions per minute.

The machine was accelerated to a speed of 2000 RPM. At time t=0.00 s, the flux was built up to its rated value. At time t=0.025 s, a load step was carried out in both parts of the machine. Battery voltages Udc1 and Udc2 are identical (Udc1=225 V and Udc2=225 V).

As depicted, a smaller torque is demanded (partial load operation), and the machine is actuated with FOR according to FIG. 3 up to time t=0.1 s. At time t1=0.1 s, winding u, v, w is operated with FOS. It can be seen that currents Is1A and Is1B contain small deviations. Currents Is1A and Is1B can continue to be measured and are regulated. They agree with their reference values. Up to time t1=0.1 s, the torque was divided equally between both windings. After t1=0.1 s, the winding with FOR (x, y, z) is actuated to the maximum torque thereof. The winding with FOS (u, v, w) adjusts the remainder of the total torque. Small deviations are to be seen in the u, v, w winding after t1=0.1 because of FOS. It can be seen that the currents (Is1A, Is1B, Is2A, Is2B) run steadily overall and the interactions between them are optimally compensated through FOS and the decoupling network.

The method according to the invention shows the advantage of improving the accuracy of the drive as far as possible. The expanded flux model can deliver a good estimation of the rotor flux and the rotor flux angle. To this end, the mutual dependence of the two axes A and B for each three-phase winding and the dependence of each three-phase winding on the other three-phase winding was optimally compensated for all possible FOR/FOS combinations. In this way, an improved dynamic and high accuracy of torque is achieved even during failure of current sensors.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an asynchronous machine, comprising:
   a first closed loop control of a first three-phase winding by
      a first closed loop control method, comprising:

supplying a first voltage vector to a first inverter device for operation of the first three-phase winding; and
a second closed loop control of a second three-phase winding by a second closed loop control method, comprising:
supplying a second voltage vector to a second inverter device for the operation of the second three-phase winding; and
changing from the first closed loop control method to a first open loop control method in reaction to a first event;
wherein the first open loop control method comprises:
supplying a first reference current vector to a first filter device configured to filter a first reference current vector;
supplying the filtered first reference current vector to a calculation device configured to calculate an electrical angle;
supplying the electrical angle to a first transformation device configured to transform a first open loop control deviation vector;
transforming a first open loop control deviation vector into a third voltage vector; and
supplying the third voltage vector to the first inverter device to operate the first three-phase winding.

2. The method according to claim 1, further comprising in reaction to at least one of the first event and a second event:
changing from the second closed loop control method to a second open loop control method, wherein the second open loop control method comprises:
supplying a second reference current vector to a second filter device configured to filter the second reference current vector;
supplying the filtered second reference current vector to the calculation device configured to calculate the electrical angle;
supplying the electrical angle to a second transformation device configured to transform a second open loop control deviation vector;
generating a fourth voltage vector from the second open loop control deviation vector; and
supplying the fourth voltage vector to the second inverter device to operate the second three-phase winding.

3. The method according to claim 1, wherein the first event comprises a failure of a current sensor associated with the first three-phase winding.

4. The method according to claim 2, wherein the second event comprises a failure of a current sensor associated with the second three-phase winding.

5. The method according to claim 2, wherein at least one of the first event and the second event comprises a user input.

6. The method according to claim 1, wherein the first closed loop control method comprises:
receiving a first measurement vector, wherein the first measurement vector has three phase current values;
calculating a first difference from the first reference current vector and from the first measurement vector;
supplying the first difference to a proportional integrator to generate a first closed loop control deviation vector; and
transforming the first closed loop control deviation vector into a first voltage vector by an electrical angle,
wherein supplying the first voltage vector to a first inverter device for the operation of the first three-phase winding includes generating a first PWM vector from the first voltage vector and supplying the first PWM vector to the first inverter.

7. A computer program product for the operation of an asynchronous machine executed by a microcontroller to cause the microprocessor to implement a method, wherein the method comprises:
a first closed loop control of a first three-phase winding by a first closed loop control method, comprising:
supplying a first voltage vector to a first inverter device for operation of the first three-phase winding; and
a second closed loop control of a second three-phase winding by a second closed loop control method, comprising:
supplying a second voltage vector to a second inverter device for the operation of the second three-phase winding; and
changing from the first closed loop control method to a first open loop control method in reaction to a first event;
wherein the first open loop control method comprises:
supplying a first reference current vector to a first filter device configured to filter a first reference current vector;
supplying the filtered first reference current vector to a calculation device configured to calculate an electrical angle;
supplying the electrical angle to a first transformation device configured to transform a first open loop control deviation vector;
transforming a first open loop control deviation vector into a third voltage vector; and
supplying the third voltage vector to the first inverter device to operate the first three-phase winding.

8. An asynchronous machine comprising a stator with a first three-phase winding and a second three-phase winding, a rotor, a first inverter device and a second inverter device, wherein the asynchronous machine is operated with a method comprising:
a first closed loop control of a first three-phase winding by a first closed loop control method, comprising:
supplying a first voltage vector to a first inverter device for operation of the first three-phase winding; and
a second closed loop control of a second three-phase winding by a second closed loop control method, comprising:
supplying a second voltage vector to a second inverter device for the operation of the second three-phase winding; and
changing from the first closed loop control method to a first open loop control method in reaction to a first event;
wherein the first open loop control method comprises:
supplying a first reference current vector to a first filter device configured to filter a first reference current vector;
supplying the filtered first reference current vector to a calculation device configured to calculate an electrical angle;
supplying the electrical angle to a first transformation device configured to transform a first open loop control deviation vector;
transforming a first open loop control deviation vector into a third voltage vector; and supplying the third voltage vector to the first inverter device to operate the first three-phase winding.

* * * * *